United States Patent
Kawaguchi et al.

(10) Patent No.: US 9,634,884 B2
(45) Date of Patent: Apr. 25, 2017

(54) MONITORING APPARATUS, MONITORING METHOD AND MONITORING PROGRAM

(71) Applicant: FUJITSU LIMITED, Kawasaki-shi, Kanagawa (JP)

(72) Inventors: Kinji Kawaguchi, Yokohama (JP); Masahiko Ohashi, Nagoya (JP); Natsuko Arai, Chofu (JP); Mitsuhiko Miwa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 14/607,405

(22) Filed: Jan. 28, 2015

(65) Prior Publication Data

US 2015/0222478 A1    Aug. 6, 2015

(30) Foreign Application Priority Data

Jan. 31, 2014 (JP) ................................. 2014-017249

(51) Int. Cl.
    *H04L 12/24* (2006.01)
(52) U.S. Cl.
    CPC ...... *H04L 41/0636* (2013.01); *H04L 41/0672* (2013.01); *H04L 41/0859* (2013.01)
(58) Field of Classification Search
    CPC .................................................. H04L 41/0636
    USPC ........................................................ 370/244
    See application file for complete search history.

(56) References Cited

U.S. PATENT DOCUMENTS

| 2001/0029529 A1 | 10/2001 | Tachibana et al. | |
| 2004/0162650 A1* | 8/2004 | Kueperkoch | B60G 17/0185 701/29.2 |
| 2009/0083576 A1* | 3/2009 | Vlassova | G06F 17/5009 714/26 |
| 2010/0332661 A1 | 12/2010 | Tameshige | |
| 2011/0225582 A1 | 9/2011 | Iikura et al. | |
| 2015/0040129 A1* | 2/2015 | Park | G06F 9/45558 718/1 |

(Continued)

FOREIGN PATENT DOCUMENTS

| JP | 2001-344130 | 12/2001 |
| JP | 2011-008481 | 1/2011 |

(Continued)

*Primary Examiner* — Melvin Marcelo
*Assistant Examiner* — Peter G Solinsky
(74) *Attorney, Agent, or Firm* — Fujitsu Patent Center

(57) ABSTRACT

An apparatus monitors a communication system including at least one communication device. The monitoring apparatus includes a memory, a processor. A second virtual system is generated by changing a first virtual system determined according to a combination of an arrangement of a plurality of virtual machines arranged in the at least one communication device, and a communication path between the plurality of virtual machines. The memory stores system information that represents an arrangement and a communication path of virtual machines used in the second virtual system. The processor receives the fault information that reports an occurrence of a fault. The processor identifies the fault information as being generated in the virtual machine within the first virtual system when a specified fault detected in a case where the fault information is transmitted from any of the virtual machines within the second virtual system represented by the system information is not detected.

9 Claims, 21 Drawing Sheets

(56) References Cited

U.S. PATENT DOCUMENTS

2015/0154062 A1* 6/2015 Watanabe ........... G06F 11/0727
714/26
2015/0229641 A1* 8/2015 Sun ........................ H04L 49/70
726/1

FOREIGN PATENT DOCUMENTS

JP  2011-186783  9/2011
JP  2011-191807  9/2011

* cited by examiner

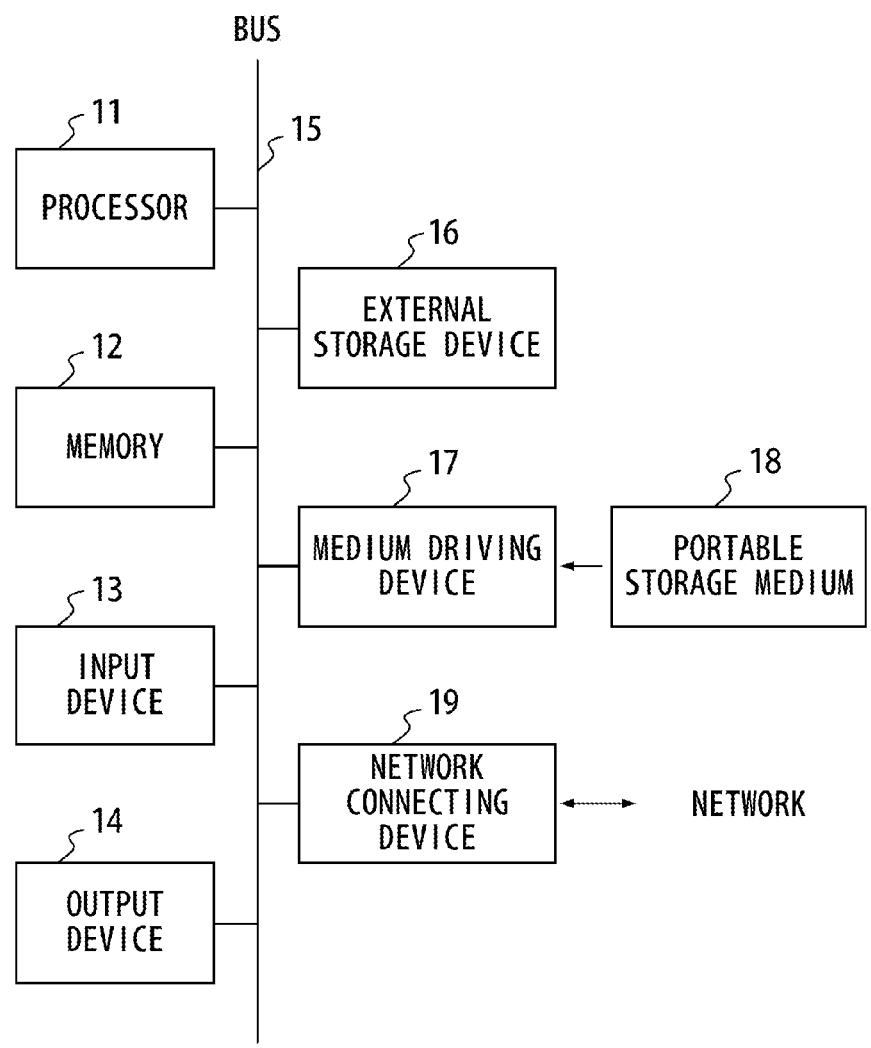
F I G. 3

C11 511

| LAYER | SECTION | | | | HIGHER-LEVEL SECTION | | | | RUNNING STATE OF SECTION | FAULT INFORMATION IN C11 | NOTIFICATION INFORMATION |
|---|---|---|---|---|---|---|---|---|---|---|---|
| | INPUT LINE | ORIGI- NATING END | TERMI- NATING END | OUTPUT LINE | INPUT LINE | ORIGI- NATING END | TERMI- NATING END | OUTPUT LINE | | | |
| 1 | L2 | E3 | E4 | L4 | L3 | | | | NORMAL | (NONE) | (NONE) |
| 2 | L1 | E2 | E5 | L5 | L2 | E3 | E4 | L4 | NORMAL | (NONE) | (NONE) |
| 3 | CH1 | E1 | E6 | CH3 | L1 | E2 | E5 | L5 | NORMAL | (NONE) | (NONE) |
| 3 | CH2 | E1 | E6 | CH4 | L1 | E2 | E5 | L5 | NORMAL | (NONE) | (NONE) |

F I G. 6 A

C12 512

| LAYER | INPUT LINE | SECTION | | | HIGHER-LEVEL SECTION | | | | RUNNING STATE OF SECTION | FAULT INFORMATION IN C12 | NOTIFICATION INFORMATION |
|---|---|---|---|---|---|---|---|---|---|---|---|
| | | ORIGINATING END | TERMINATING END | OUTPUT LINE | INPUT LINE | ORIGINATING END | TERMINATING END | OUTPUT LINE | | | |
| 1 | L2 | E3 | E4 | L4 | L3 | | | | NORMAL | (NONE) | (NONE) |
| 1 | L7 | E3 | E4 | L4 | L3 | | | | NORMAL | (NONE) | (NONE) |
| 2 | L1 | E2 | E5 | L5 | L2 | E3 | E4 | L4 | NORMAL | (NONE) | (NONE) |
| 2 | L6 | E7 | E5 | L5 | L7 | E3 | E4 | L4 | NORMAL | (NONE) | (NONE) |
| 3 | CH1 | E1 | E6 | CH3 | L1 | E7 | E5 | L5 | NORMAL | (NONE) | (NONE) |
| 3 | CH2 | E1 | E6 | CH4 | L6 | E7 | E5 | L5 | NORMAL | (NONE) | (NONE) |

| LAYER | SECTION | | | | HIGHER-LEVEL SECTION | | | | RUNNING STATE OF SECTION | FAULT INFORMATION IN C13 | NOTIFICATION INFORMATION |
|---|---|---|---|---|---|---|---|---|---|---|---|
| | INPUT LINE | ORIGI- NATING END | TERMI- NATING END | OUTPUT LINE | INPUT LINE | ORIGI- NATING END | TERMI- NATING END | OUTPUT LINE | | | |
| 1 | L2 | E3 | E4 | L4 | L3 | | | | NORMAL | (NONE) | (NONE) |
| 1 | L7 | E3 | E4 | L4 | L3 | | | | NORMAL | (NONE) | L7:ACCESS FAILURE |
| 2 | L1 | E2 | E5 | L5 | L2 | E3 | E4 | L4 | NORMAL | (NONE) | (NONE) |
| 2 | L6 | E7 | E5 | L5 | L7 | E3 | E4 | L4 | NORMAL | (NONE) | E7:NIC FAILURE L6:ACCESS FAILURE L7:ACCESS FAILURE |
| 3 | CH1 | E1 | E6 | CH3 | L1 | E2 | E5 | L5 | NORMAL | (NONE) | (NONE) |
| 3 | CH2 | E1 | E6 | CH4 | L6 | E7 | E5 | L5 | NORMAL | (NONE) | L6:ACCESS FAILURE |

F I G. 8A

C13
~513b

| LAYER | SECTION | | | | HIGHER-LEVEL SECTION | | | | RUNNING STATE OF SECTION | FAULT INFORMATION IN C13 | NOTIFICATION INFORMATION |
|---|---|---|---|---|---|---|---|---|---|---|---|
| | INPUT LINE | ORIGI-NATING END | TERMI-NATING END | OUTPUT LINE | INPUT LINE | ORIGI-NATING END | TERM-INATING END | OUTPUT LINE | | | |
| 1 | L2 | E3 | E4 | L4 | L3 | | | | NORMAL | (NONE) | (NONE) |
| 1 | L7 | E3 | E4 | L4 | L3 | | | | ABNORMAL | L7:ACCESS FAILURE | L7:ACCESS FAILURE |
| 2 | L1 | E2 | E5 | L5 | L2 | E3 | E4 | L4 | NORMAL | (NONE) | (NONE) |
| 2 | L6 | E7 | E5 | L5 | L7 | E3 | E4 | L4 | ABNORMAL | E7:NIC FAILURE L6:ACCESS FAILURE L7:ACCESS FAILURE | E7:NIC FAILURE L6:ACCESS FAILURE L7:ACCESS FAILURE |
| 3 | CH1 | E1 | E6 | CH3 | L1 | E2 | E5 | L5 | NORMAL | (NONE) | (NONE) |
| 3 | CH2 | E1 | E6 | CH4 | L6 | E7 | E5 | L5 | ABNORMAL | L6:ACCESS FAILURE | L6:ACCESS FAILURE |

F I G. 8 B

C14

| LAYER | SECTION | | | | HIGHER-LEVEL SECTION | | | | RUNNING STATE OF SECTION | FAULT INFORMATION IN C14 | NOTIFICATION INFORMATION |
|---|---|---|---|---|---|---|---|---|---|---|---|
| | INPUT LINE | ORIGI- NATING END | TERMI- NATING END | OUTPUT LINE | INPUT LINE | ORIGI- NATING END | TERMI- NATING END | OUTPUT LINE | | | |
| 1 | L2 | E3 | E4 | L4 | L3 | | | | NORMAL | (NONE) | (NONE) |
| 1 | L9 | E3 | E4 | L4 | L3 | | | | NORMAL | (NONE) | (NONE) |
| 2 | L1 | E2 | E5 | L5 | L2 | E3 | E4 | L4 | NORMAL | (NONE) | (NONE) |
| 2 | L8 | E7 | E5 | L5 | L9 | E3 | E4 | L4 | NORMAL | (NONE) | (NONE) |
| 3 | CH1 | E1 | E6 | CH3 | L1 | E2 | E5 | L5 | NORMAL | (NONE) | (NONE) |
| 3 | CH2 | E1 | E6 | CH4 | L8 | E7 | E5 | L5 | NORMAL | (NONE) | (NONE) |

| LAYER | SECTION | | | | HIGHER-LEVEL SECTION | | | | RUNNING STATE OF SECTION | FAULT INFOR- MATION IN C14 | NOTIFICATION INFORMATION |
|---|---|---|---|---|---|---|---|---|---|---|---|
| | INPUT LINE | ORIGI- NATING END | TERMI- NATING END | OUTPUT LINE | INPUT LINE | ORIGI- NATING END | TERMI- NATING END | OUTPUT LINE | | | |
| 1 | L2 | E3 | E4 | L4 | L3 | | | | NORMAL | (NONE) | (NONE) |
| 1 | L9 | E3 | E4 | L4 | L3 | | | | NORMAL | (NONE) | (NONE) |
| 2 | L1 | E2 | E5 | L5 | L2 | E3 | E4 | L4 | NORMAL | (NONE) | (NONE) |
| 2 | L8 | E7 | E5 | L5 | L9 | E3 | E4 | L4 | NORMAL | (NONE) | E7:APPLICATION COMMUNICATION ERROR |
| 3 | CH1 | E1 | E6 | CH3 | L1 | E2 | E5 | L5 | NORMAL | (NONE) | (NONE) |
| 3 | CH2 | E1 | E6 | CH4 | L8 | E7 | E5 | L5 | NORMAL | (NONE) | (NONE) |

F I G. 1 0 B

C13 513c

| LAYER | SECTION | | | | HIGHER-LEVEL SECTION | | | | RUNNING STATE OF SECTION | FAULT INFORMATION IN C13 | NOTIFICATION INFORMATION |
|---|---|---|---|---|---|---|---|---|---|---|---|
| | INPUT LINE | ORIGI-NATING END | TERMI-NATING END | OUTPUT LINE | INPUT LINE | ORIGI-NATING END | TERMI-NATING END | OUTPUT LINE | | | |
| 1 | L2 | E3 | E4 | L4 | L3 | | | | NORMAL | (NONE) | (NONE) |
| 1 | L7 | E3 | E4 | L4 | L3 | | | | ABNORMAL | L7:ACCESS FAILURE | (NONE) |
| 2 | L1 | E2 | E5 | L5 | L2 | E3 | E4 | L4 | NORMAL | (NONE) | (NONE) |
| 2 | L6 | E7 | E5 | L5 | L7 | E3 | E4 | L4 | ABNORMAL | E7:NIC FAILURE L6:ACCESS FAILURE L7:ACCESS FAILURE E7:APPLICATION COMMUNICATION ERROR | E7:APPLICATION COMMUNICATION ERROR |
| 3 | CH1 | E1 | E6 | CH3 | L1 | E2 | E5 | L5 | NORMAL | (NONE) | (NONE) |
| 3 | CH2 | E1 | E6 | CH4 | L6 | E7 | E5 | L5 | ABNORMAL | L6:ACCESS FAILURE | (NONE) |

F I G. 1 2

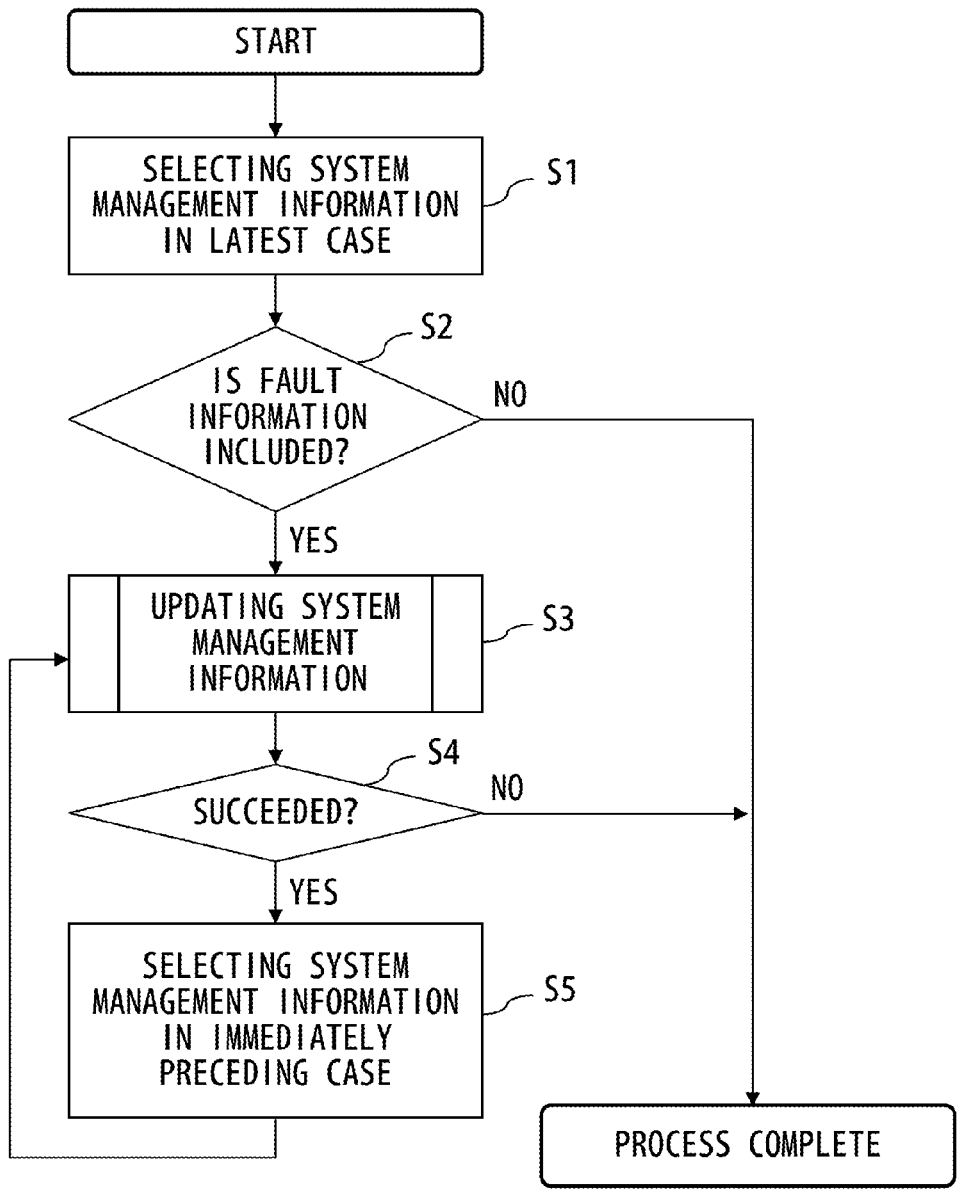
F I G. 1 3

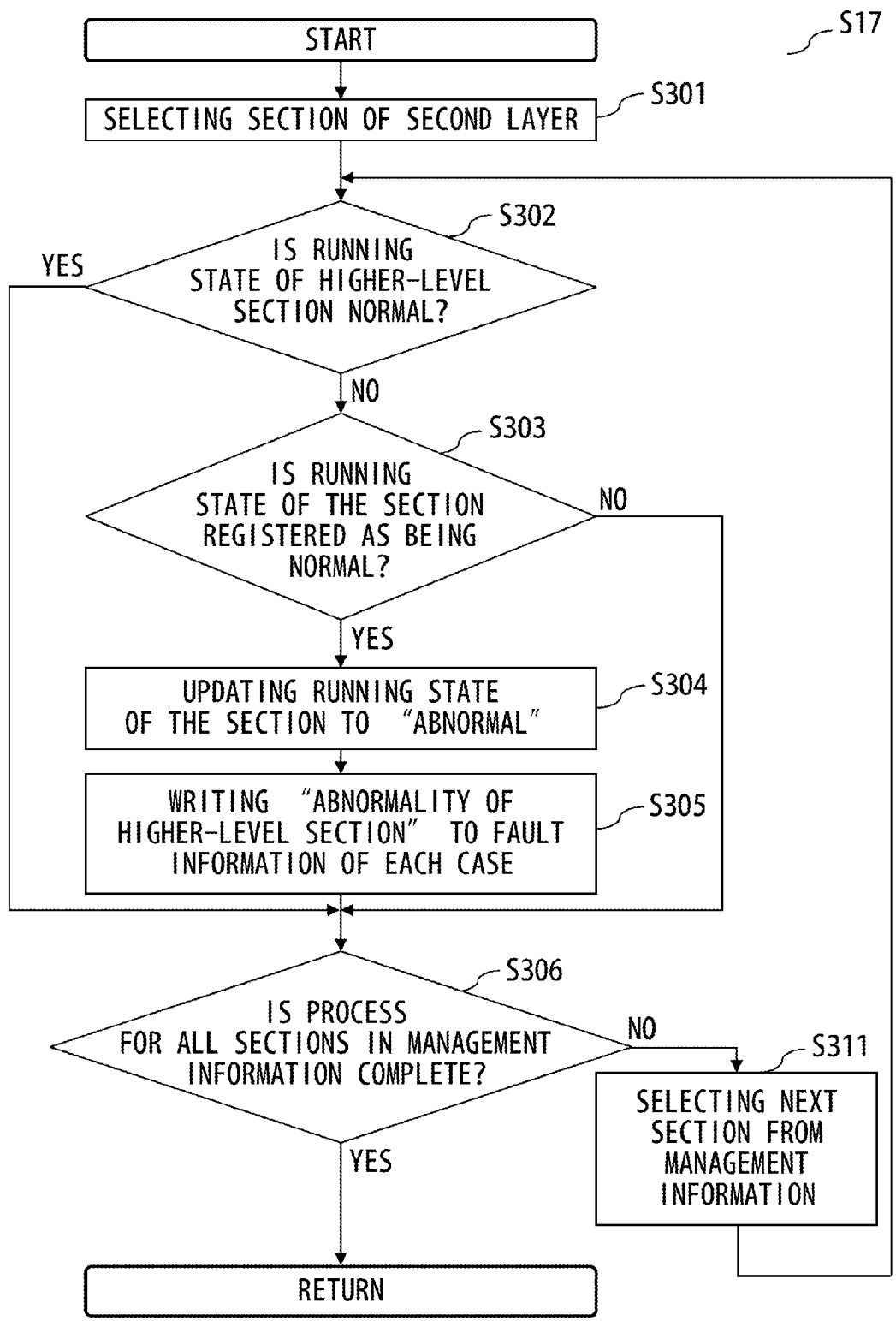
F I G. 17

MONITORING APPARATUS, MONITORING METHOD AND MONITORING PROGRAM

CROSS-REFERENCE TO RELATED APPLICATION

This application is based upon and claims the benefit of priority of the prior Japanese Patent Application No. 2014-017249, filed on Jan. 31, 2014, the entire contents of which are incorporated herein by reference.

FIELD

The embodiments discussed herein are related to maintenance management of a network.

BACKGROUND

A communication system in which a server virtualization technique and SDN (Software Defined Networking) are introduced is used for a communication service. In the communication system in which the server virtualization technique is introduced, the number of VMs (Virtual Machines) in a communication node is increased or decreased depending on a process. For example, the communication system performs a communication by using a communication path via an increased VM, so that traffic of a used communication path can be distributed. SDN is a technique for selecting an optimum communication path from among a plurality of communication paths within a communication system. The communication system in which a server virtualization technique and SDN (Software Defined Networking) are introduced changes dynamically communication paths.

Additionally, with the server virtualization technique, a VM sometimes transfers a server that executes a process for the VM to another physical server when a fault occurs in a network within a communication system. The technique for transferring a process for a VM to another physical server is called migration.

As a technique related to the server virtualization technique, a method for determining a physical resource by assigning an identifier to the physical resource and a virtual resource even when the virtual resource is transferred to another physical resource is known (for example, see Patent Document 1).

As another technique related to the server virtualization technique, a technique for detecting a change in a configuration of a virtual machine is known (for example, see Patent Document 2).

As a technique related to migration, a technique for linking between log information of a physical server and a software resource even when the physical server that performs business operations is transferred is known (for example, see Patent Document 3).

As another technique related to migration, a technique for obtaining configuration information transmitted from a terminal, and for storing the configuration information in association with generation information is known (for example, see Patent Document 4).

Patent Document 1: Japanese Laid-open Patent Publication No. 2011-191807
Patent Document 2: Japanese Laid-open Patent Publication No. 2011-186783
Patent Document 3: Japanese Laid-open Patent Publication No. 2011-008481
Patent Document 4: Japanese Laid-open Patent Publication No. 2001-344130

SUMMARY

According to an aspect of the embodiments, a monitoring apparatus monitors a communication system including at least one communication device. The monitoring apparatus includes a memory, a processor. A second virtual system is generated by changing a first virtual system determined according to a combination of an arrangement of a plurality of virtual machines arranged in the at least one communication device, and a communication path between the plurality of virtual machines. The memory stores system information that represents an arrangement and a communication path of virtual machines used in the second virtual system. The processor receives the fault information that reports an occurrence of a fault. The processor identifies the fault information as being generated in the virtual machine within the first virtual system when a specified fault detected in a case where the fault information is transmitted from any of the virtual machines within the second virtual system represented by the system information is not detected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a hardware configuration of the monitoring apparatus;
FIG. 6A is an explanatory diagram (No. 1) of an example of management information;
FIG. 6B is an explanatory diagram (No. 1) of an example of management information;
FIG. 8A is an explanatory diagram (No. 2) of examples of management information;
FIG. 8B is an explanatory diagram (No. 2) of examples of management information;
FIG. 10A is an explanatory diagram (No. 3) of examples of management information;
FIG. 10B is an explanatory diagram (No. 3) of examples of management information;
FIG. 12 is an explanatory diagram (No. 4) of an example of the management information;

FIG. 13 is a flowchart for explaining an example (No. 1) of a process for updating management information;

FIG. 17 is a flowchart for explaining an example (No. 2) of the process for the management information writing unit.

DESCRIPTION OF EMBODIMENTS

When a fault occurs within a communication system in which a communication path is dynamically changed, a state of the system at a point in time when an administrator of the system examines a cause of the fault may be already different from that at a point in time when the fault has occurred. Accordingly, the administrator initially obtains state information of the system at the point in time when he or she begins examining the fault, and scrutinizes information such as a path on which a communication is performed, and other items of information. Here, even if the administrator attempts to identify the cause of the fault by using fault information, he or she cannot identify the cause of the fault because the state of the system is already different from that at the point in time when the fault has occurred. Thus, the administrator examines the state of the system by tracing back to the starting point of the examination. When the administrator has finished examining the state of the system, he or she identifies the cause of the fault. The administrator repeats operations for examining the state of the system and for identifying the cause of the fault until he or she can identify the cause of the fault. Accordingly, the administrator needs a huge amount of time for operations of identifying a path on which a communication is performed at the time of a fault, and for examinations such as a determination of a fault, and the like in a communication system where a communication path is dynamically changed. In one aspect, an object of the present invention is to bring efficiency to an analysis process executed when a fault occurs.

Embodiments according to the present invention are described in detail below with reference to the drawings.

Figure 1:
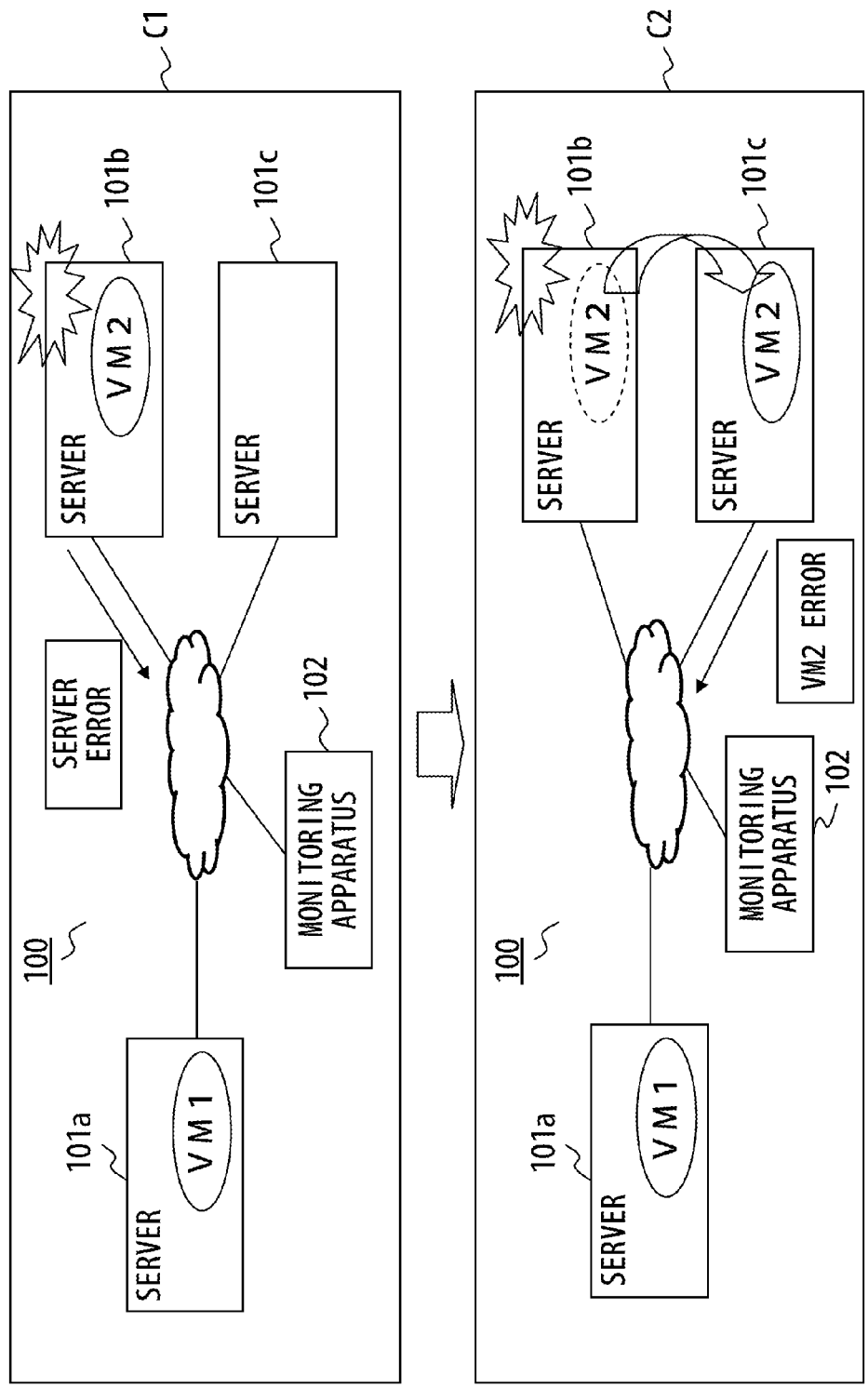
FIG. 1 is an explanatory diagram of an example of a communication system according to a first embodiment.

FIG. 1 is an explanatory diagram of an example of a communication system according to a first embodiment. The communication system 100 includes servers 101 (101a to 101c) and a monitoring apparatus 102. The server 101a operates a VM1 (Virtual Machine). The server 101b operates a VM2. Although the communication system 100 includes the servers 101a to 101c, the VM1 and the VM2, the communication system 100 may include other servers 101 and VMs. The monitoring apparatus 102 monitors a communication state within the communication system 100.

In the communication system 100 in a case C1, the monitoring apparatus 102 holds, as management information of the case C1, information about an arrangement and communication paths of the servers 101, the VM1, and the VM2 in the case C1. The management information is held for each updated system configuration each time the arrangement of VMs, a communication path between VMs, or the like within the communication system 100 is changed. The communication system 100 in the case C1 is an example in a case where a fault occurs in the server 101b. For instance, when a fault occurs in an NIC (Network Interface Card) of the server 101b, two pieces of fault information, such as an error indicating the NIC failure of the server 101b and an error of the VM2, to which the NIC is allocated, are generated. The server 101b notifies the monitoring apparatus 102 of the fault information of the NIC by using an NIC where a fault does not occur. This fault information of an NIC is referred to as "first fault information". The monitoring apparatus 102 holds the first fault information, which is received from the server 101b, in the management information in the case C1. In the meantime, the VM2 cannot notify the monitoring apparatus 102 of the fault information of the VM2 since the fault occurs in the NIC allocated to the VM2. The fault information of the VM2, which is not reported to the monitoring apparatus 102, in the communication system where an error occurs, is referred to as "second fault information". In order to continue the process of the communication system, the VM2 migrates the process to the server 101c.

In the communication system 100 in a case C2, the monitoring apparatus 102 holds, as management information in the case C2, information about an arrangement and communication paths of the servers 101, the VM1, and the VM2 in the case C2. In the communication system 100 in the Case C2, the VM2 is running in the server 101c. The VM2 notifies the monitoring apparatus 102 of the second fault information by using the NIC of the server 101c. Since the VM2 executes the process in the server 101c where a fault does not occur, the VM2 recognizes that it has recovered from the error that occurred in the case C1. Accordingly, the VM2 notifies the monitoring apparatus 2 of recovery information indicating that the VM2 has recovered from the state of the fault. The process of the VM2 is migrated from the server 101b where the fault occurs to the server 101c where a fault does not occur, so that the communication system 100 can continue the communication between the VM1 and the VM2.

In the case C2, the monitoring apparatus 102 receives the second fault information detected on the basis of the fact that the VM2 that was arranged in the server 101b is received not from the server 101b where the fault occurs but from the server 101c where a fault does not occur. Namely, the monitoring apparatus 102 receives fault information from a server where a fault does not occur on first glance. The monitoring apparatus 102 starts a process for identifying the cause of the fault within the communication system 100. The process for identifying the cause of the fault within the communication system 100 is executed by using management information in each case, and an FTA (Fault Tree Analysis). The FTA is a method for analyzing a fault by using a path where a fault occurs, a cause of an occurrence of the fault, and a probability of an occurrence by using "fault tree diagrams" (to be described later with reference to FIG. 9). The fault tree diagrams are used to identify the first fault information predicted to be output along with the second fault information reported by the VM.

When the monitoring apparatus 102 receives the second fault information from the VM2 in the case C2, the monitoring apparatus 102 causes the second fault information to be stored in the management information in the case C2. By using the fault tree diagrams, the monitoring apparatus 102 determines that the information predicted to be output along with the second fault information is the first fault information. Here, assume that the error identified as occurring in the current communication system (in the case C2) is recorded in the management information. The monitoring apparatus 102 determines whether the first fault information is included in the management information in the case C2. When the first fault information is not included in the management information in the case C2, the monitoring apparatus 102 identifies the received second fault information as the fault that has occurred in the communication system 100 in the case C1.

In the meantime, when the first fault information is included in the management information in the case C2, the monitoring apparatus 102 identifies the second fault information as the fault that has occurred in the communication system 100 in the Case 2. Then, the monitoring apparatus 102 writes the second fault information to the management information, and displays a result of the identification so that an administrator can verify the result. In this case, since the communication system continues running unchanged in the state where the fault has occurred, the administrator can determine that measures are to be taken urgently.

The monitoring apparatus 102 determines whether a case of a point in time at which a fault occurs is the same as a case of a point in time at which the monitoring apparatus 102 is notified of the fault. Therefore, the administrator can determine whether measures are to be urgently taken. Moreover, since the monitoring apparatus 102 executes the process for identifying a cause and a position of a fault, the administrator can learn the cause of the fault without being conscious of a dynamic change in the communication system. Moreover, operations for identifying the cause of the fault, which are performed by the administrator, are reduced.

Figure 2:
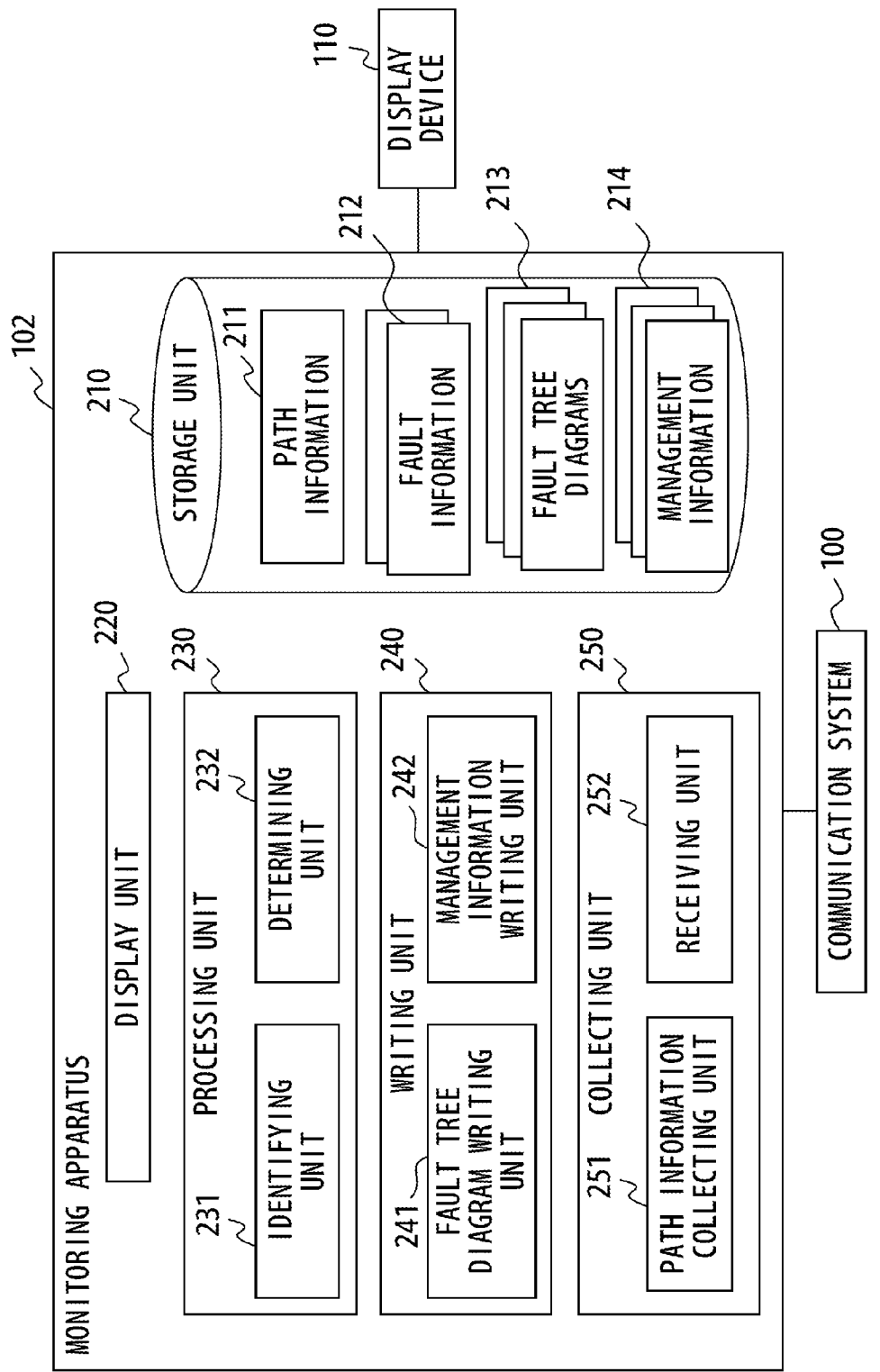
FIG. 2 is an explanatory diagram of an example of a configuration of a monitoring apparatus.

FIG. 2 is an explanatory diagram of an example of a configuration of the monitoring apparatus. The monitoring apparatus 102 includes a storage unit 210, a display unit 220, a processing unit 230, a writing unit 240, and a collecting unit 250. The collecting unit 250 includes a path information collecting unit 251 and a receiving unit 252. The path information collecting unit 251 collects information of an arrangement and communication paths of the servers 101 and the VMs within the communication system 100. Moreover, the path information collecting unit 251 causes the storage unit 210 to store the collected path information 211. The receiving unit 252 receives fault information from each server within the communication system 100. The receiving unit 252 causes the storage unit 210 to store the received fault information 212.

The writing unit 240 includes a fault tree diagram writing unit 241 and a management information writing unit 242. The writing unit 240 reflects changed path information 211 on the fault tree diagrams 213 and the management information 214 when a communication path of the communication system 100 is changed, as represented by the case C1 to the case C2. The fault tree diagram writing unit 241 reflects the path information 211 on the fault tree diagram 213 of the storage unit 210. The storage unit 210 holds the fault tree diagram 213 in each case. The management information writing unit 242 writes the path information 211 to the management information 214 in the storage unit 210. Moreover, the management information writing unit 242 writes the fault information 212 to the management information 214. The storage unit 210 holds the management information 214 in each case. When fault information is not received for a certain amount of time or longer, the identifying unit 231 validates the management information 214 and the fault tree diagrams 213 in the latest case and the second latest case, and invalidates the rest of the information and the diagrams. The invalidated data may be deleted.

The processing unit 230 includes an identifying unit 231 and a determining unit 232. When the second fault information is received, the identifying unit 231 identifies the first fault information predicted to be output along with the second fault information. Thereafter, the determining unit 232 determines whether the management information 214 in the case where the second fault information is received includes the first fault information. When the management information 214 in the case where the second fault information is received does not include the first fault information, the identifying unit 231 identifies a case where the first fault information is received by using the management information 214 including the first fault information. Moreover, the determining unit 232 and the identifying unit 231 determine a main cause and a position of the fault on the basis of the first fault information and the second fault information by using the management information 214 in the case to be processed by the identifying unit 231, and the fault tree diagram 213 in the same case.

The display unit 220 notifies the display device 110 of the main cause and the position of the fault, and the management information in the identified case. The display device 110 presents the fault information within the management information to the administrator.

FIG. 3 illustrates an example of a hardware configuration of the monitoring apparatus. The monitoring apparatus 102 includes a processor 11, a memory 12, a bus 15, an external storage device 16, and a network connecting device 19. The monitoring apparatus 102 may further include an input device 13, an output device 14, and a medium driving device 17 as options. The monitoring apparatus 102 is sometimes implemented, for example, with a computer or the like.

The processor 11 can be implemented as an arbitrary processing circuit including a central processing unit (CPU). The processor 11 operates as the display unit 220, the processing unit 230, the writing unit 240, and the collecting unit 250. The processor 11 can execute a program stored, for example, in the external storage device 16. The memory 12 operates as the storage unit 210, and holds the path information 211, the fault information 212, the fault tree diagrams 213, and the management information 214. The memory 12 also stores data obtained by an operation of the processor 11, and data used for the process executed by the processor 11 when needed. The network connecting device 19 is used to communicate with another device, and it operates.

The input device 13 is implemented, for example, as a button, a keyboard, a mouse, or the like. The output device 14 is implemented, for example, as a display or the like. The output device 14 is not always needed. The bus 15 interconnects the processor 11, the memory 12, the input device 13, the output device 14, the external storage device 16, the medium driving device 17, and the network connecting device 19 so that these components can mutually exchange data. The external storage device 16 stores a program, data and the like, and provides the stored information to the processor 11 or the like when needed. The medium driving device 17 can output the data stored in the memory 12 or the external storage device 16 to a portable storage medium 18. Moreover, the medium driving device 17 reads a program, data or the like from the portable storage medium 18. Here, the portable storage medium 18 can be implemented as an arbitrary portable storage medium including a floppy disk, a magneto-optical (MO) disk, a compact disk recordable (CD-R), and a digital versatile disk recordable (DVD-R).

Figure 4:
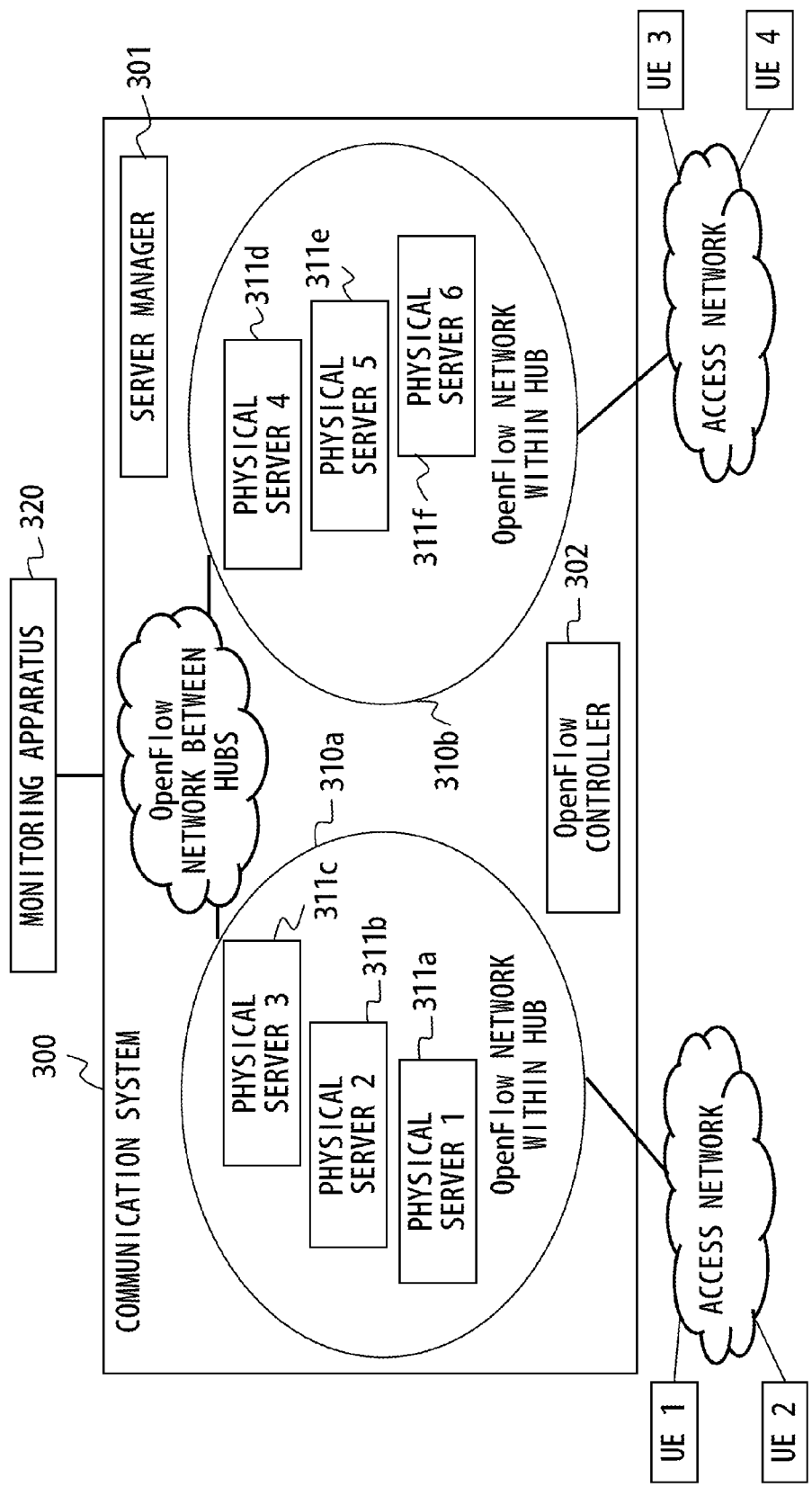
FIG. 4 is an explanatory diagram of an example of physical servers within a communication system according to a second embodiment.

FIG. 4 is an explanatory diagram of an example of physical servers within the communication system according to a second embodiment. The communication system 300 is a relay system where a communication from a UE (User Equipment) 1 or a UE2 to a UE3 and a UE4 is performed. The communication system 300 has a hub 310a, a hub 310b, a server manager 301, and an OpenFlow controller 302. Each of the UEs may be a communication device that performs a communication via a network. When the UE1 transmits data to the UE4, communication data from the UE1 is transmitted to the UE4 via the hub 310a and the hub 310b in the OpenFlow network. The network between the hub 310a and the hub 310b is the OpenFlow network. The hubs 310 (310a and 310b) respectively include a plurality of servers 311 (311a to 311f).

The hub 310a includes servers 311a to 311c. The hub 310b includes servers 311d to 311f. Here, communication data from the UE1 is transmitted to the UE4 sequentially from the servers 311a, 311b, 311c, 311d, 311e, and 311f in this order.

The server manager 301 communicates with each of the servers 311 (311a to 311f), and collects fault information. The OpenFlow controller 302 controls a logical communication path in the OpenFlow network within the hubs such as the hub 310a and the hub 310b. The OpenFlow controller 302 holds information of an arrangement and communication paths of the servers and the VMs.

Figure 5:
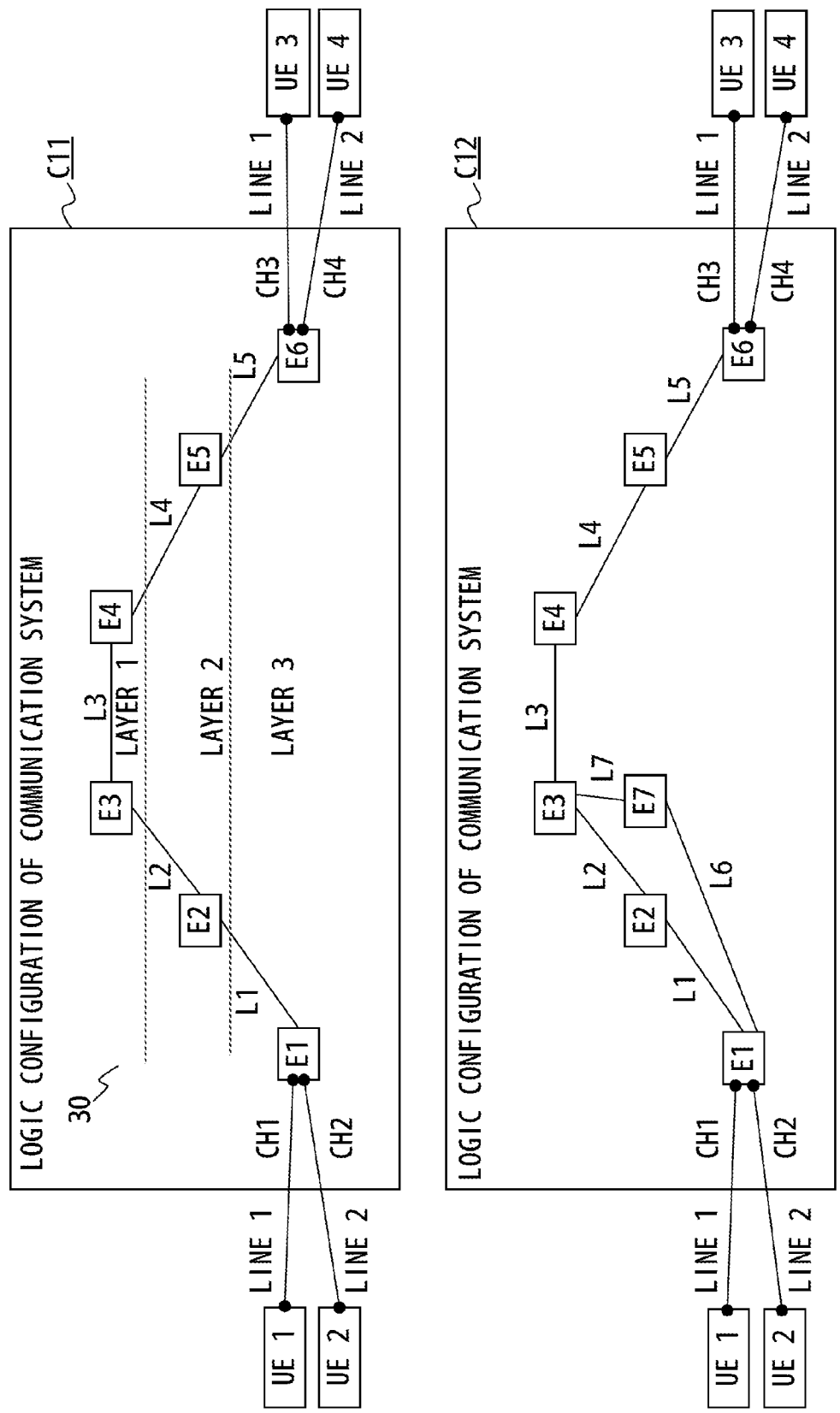
FIG. 5 is an explanatory diagram (No. 1) of an example of communication paths in the communication system according to the second embodiment.

FIG. 5 is an explanatory diagram (No. 1) of examples of communication paths in the communication system according to the second embodiment. In the communication system 300 in a case C11, the hub 310a and the hub 310b in the OpenFlow network illustrated in FIG. 4 are represented as logical communication paths. E1 is a VM accommodated in the server 311a illustrated in FIG. 4. E2 is a VM accommodated in the server 311b illustrated in FIG. 4. E3 is a VM accommodated in the server 311c illustrated in FIG. 4. E4 is a VM accommodated in the server 311d illustrated in FIG. 4. E5 is a VM accommodated in the server 311e illustrated in FIG. 4. E6 is a VM accommodated in the server 311f illustrated in FIG. 4.

E1 and E2 are connected with a logical path L1. E2 and E3 are connected with a logical path L2. E3 and E4 are connected with a logical path L3. E4 and E5 are connected with a logical path L4. E5 and E6 are connected with a logical path L5. Communication data from the UE1 is transmitted to the UE3 sequentially from E1, E2, E3, E4, E5 and E6 in this order via the paths.

Additionally, in the communication system 300 in the case C11, the VMs and the paths are put into layers. The layers are used in the management information (as will be described later). The layer 1 includes E3, E4, and L3. The layer 2 includes E2, E5, L2, and L4. The layer 3 includes E1, E6, L1, and L5.

FIG. 6A and FIG. 6B are explanatory diagrams (No. 1) of examples of management information. The management information 511 illustrated in FIG. 6A is path information of the communication system 300 in the case C11. The path information collecting unit 251 within the monitoring apparatus generates the management information. The management information includes layer information, section information, higher-level section information, state information of a section, fault information in each case, and notification information. The layer information of the management information is information obtained by putting VMs and path information into layers and combining them. The section information is information indicating VMs and paths, which are managed for each of the layers. The higher-level section information is information of a section of another layer via which a communication is performed in a section of each layer. Accordingly, a fault in a higher-level section is assumed to exert an influence also on a lower-level section. State information of a section is information indicating whether a fault occurs in a section of each layer.

The notification information is fault information received by the monitoring apparatus. The notification information is deleted at specified time intervals. As the fault information in each case, information obtained by determining that received fault information is a fault that has occurred in the communication system 300 in the case C11 is held.

An originating end and a terminating end in section information are a VM at a transmission source and a VM at a transmission destination of a communication between the VMs. For example, when a communication from the UE1 side to the UE3 side is performed, the originating end in the section information is the VM on the UE1 side. In the management information, the VM information (E1) on the UE1 side is held. The terminating end in the section information is the UE3 side. The management information holds VM information (E6) on the UE3 side as the terminating end. Next, an input line indicates a path that inputs a communication to the VM as the originating end. An output line indicates a path to which a communication is output from the VM as the terminating end.

The layer 1 of the management information 511 in the case C11 holds section information from the input line L2, through the originating end E3 and the terminating end E4, to the output line L4. Moreover, the layer 1 of the management information 511 holds information of L3 as an input line in a higher-level section. The higher-level section indicates a communication path between the originating end and the terminating end of the section information. In this case, the section of the layer 1 in the management information indicates that a communication is performed sequentially from L2, E3, L3, E4 and L4, in this order. The layer 2 of the management information 511 holds section information from the input line L1, through the originating end E2 and the terminating end E5, to the output line L5. In this section, a communication path from L2, through the originating end E3 and the terminating end E5, to L4 in the layer 1, which is a higher-level section, is used when a communication from the originating end E2 to the terminating end E5 is performed.

The layer 3 of the management information 511 holds section information from the input line CH1, through the originating end E1 and the terminating end E6, to the output line CH3. In this section, a communication path from L1, through the originating end E2 and the terminating end E5, to L5 in the layer 2, which is a higher-level section, is used when a communication from the originating end E1 to the terminating end E6 is performed. Additionally, the layer 3 of the management information 511 holds section information from the input line CH2, through the originating end E1 and the terminating end E6, to the output line CH4. In this section, a communication path from L1, through the originating end E2 and the terminating end E5, to L5 in the layer 2, which is the higher-level section, is used when a communication from the originating end E1 to the terminating end E6 is performed.

Since a fault does not occur in the case C11, state information of the section in the management information 511 is normal. The monitoring apparatus has not received any fault information. Therefore, neither fault information nor notification information is stored in each case. An example where the management information is altered with a change in the virtual system is described next. An example of a case where a new VM (E7) that links between E1 and E3 is generated because a load on the VM (E2) becomes heavier when there is an increase in the traffic of a communication.

The communication system 300 in a case C12 illustrated in FIG. 5 is a system where a new communication path is formed by using the VM of E7 in the communication system 300 in the case C11. E7 is created in the server 311b illustrated in FIG. 4. Here, a communication path between the UE1 and the UE3 passes through a communication path using E2. Namely, a communication between the UE1 and the UE3 passes through L1, E2 and L2. A communication path between the UE2 and the UE4 passes through a communication path using E7. Namely, a communication between the UE2 and the UE4 passes through L6, E7 and L7. Management information 512 generated in the communication system 300 in the case C12 is depicted in FIG. 6B.

The management information 512 in the case C12 is the example where the communication path using L6, E7 and L7 is additionally increased in the management information 511 in the case C11. Accordingly, the layer 1 and the layer 2 of the management information 512 hold one more piece of layer data than each layer of the management information 511. Note that the layer 3 of the management information 512 is changed so that the communication between CH2 and CH4 passes through the new communication path. The layer 1 of the management information 512 holds section information from the input line L7, through the originating end E3 and the terminating end E4, to the output line L4 as the increased communication path information. Information of the layer 1 (the second row) of the management information 512 holds information of L3 as an input line in a higher-level section. In this case, the section of the layer 1 (the second row) of the management information 512 indicates that a communication is performed sequentially from L7, E3, L3, E4, and L4 in this order. Next, the layer 2 (the fourth row) of the management information 512 holds section information from the input line L6, through the originating end E7 and the terminating end E5, to the output line L5 as the information of the increased communication path. In this section, the communication path from the input line L7, through the originating end E3 and the terminating end E4, to the output line L4 in the layer 1, which is the higher-level section, is used when a communication from the originating end E7 to the terminating end E5 is performed. In the layer 3 of the management information 512, a communication between CH2 and CH4 is performed by using the newly increased communication path. Accordingly, the layer 3 of the management information 512 holds section information from the input line CH2, through the originating end E1 and the terminating end E6, to the output line CH4. In this section, a communication path from the input line L6, through the originating end E7 and the terminating end E5, to the output line L5 in the layer 2, which is the higher-level section, is used when a communication from the originating end E1 to the terminating end E5 is performed.

Figure 7:
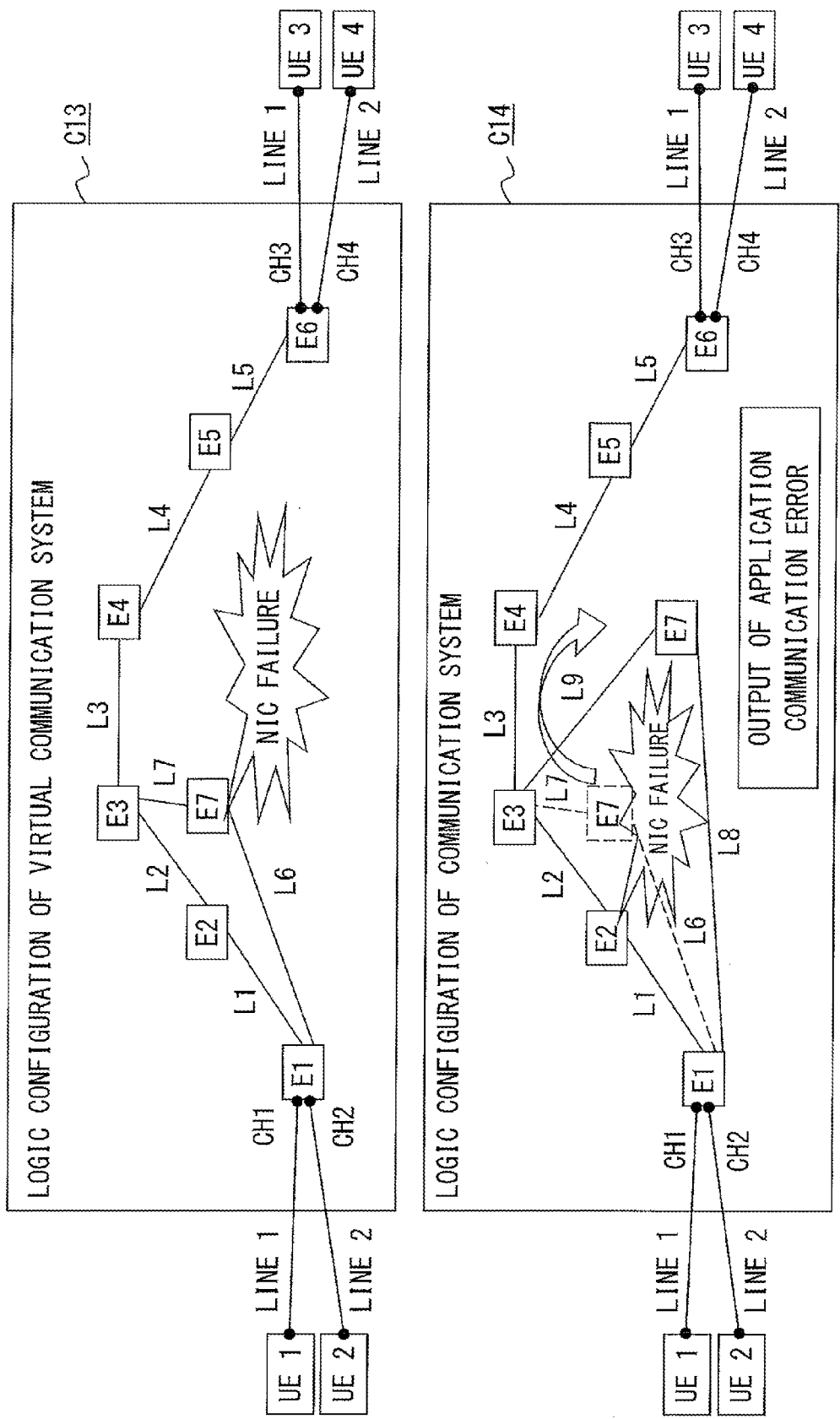
FIG. 7 is an explanatory diagram (No. 2) of an example of communication paths in the communication system according to the second embodiment.

FIG. 7 is an explanatory diagram (No. 2) of an example of communication paths in the communication system according to the second embodiment. A process executed when a fault occurs is described with reference to FIG. 7. The communication system 300 in a case C13 is an example of a state where a fault occurs in an NIC allocated to the VM of the originating end E7 in the case C12. The fault of the NIC is a physical fault of the server 311b.

When the fault occurs in the NIC of the server 311b, fault information indicating the fault of the NIC of the server 311b, and that of the VM to which the NIC where the fault occurs is allocated, are generated. The server 311b transmits fault information (the first fault information) of the NIC to the monitoring apparatus by using an NIC other than the NIC where the fault occurs. In the meantime, the fault information of the VM is, for example, an error of an application communication. Since the NIC where the fault occurs is allocated to the VM of the originating end E7, the VM cannot transmit the fault information (the second fault information) to the monitoring apparatus. Accordingly, the VM (E7) waits while holding the fault information.

The first fault information (the error reported to the monitoring apparatus 102 before the communication system is changed) includes information indicating the fault of the NIC of the originating end E7, and access failure information indicating that the paths L6 and L7 cannot access a connection destination. The management information writing unit 242 of the monitoring apparatus holds the first fault information received from E7, L6 and L7 in the management information. Moreover, since the second fault information cannot be reported to the monitoring apparatus, it is not stored in the management information in the case C12 illustrated in FIG. 6B. Namely, the management information is updated from the management information 512 illustrated in FIG. 6B to management information 513a illustrated in FIG. 8A. Details of the process executed when the management information is updated are as follows.

The processing unit 230 and the writing unit 240 cause the NIC failure information of E7 and the access failure information of L6 and L7 to be held in the notification information of the management information 512, and updates the information like the management information 513a. For example, a description of E7: NIC failure indicates that the NIC failure is reported from the VM of E7. The determining unit 232 determines in which layer of the management information 513a the NIC failure information of E7 and the access failure information of L6 and L7 are to be held. Initially, the determining unit 232 identifies the layer that includes the information indicating the VM (E7) where the fault occurs as an originating end or a terminating end of section information. The information indicating E7 is held in the information as the originating end of the layer 2 (the fourth row) like the management information 513a. Accordingly, the management information writing unit 242 writes the information of the NIC failure to the notification information of the layer 2 (the fourth row) identified by the determining unit 232.

Next, the determining unit 232 identifies VMs connected to L6 and L7. The VMs connected to L6 are E1 and E7. The VMs connected to L7 are E3 and E7. The determining unit 232 identifies a layer that includes information indicating the VMs (E1 and E7) connected to L6 as an originating end or a terminating end of the section information. The information indicating E1 is held in the information as the originating end in the layer 3 (the fifth and sixth rows) like the management information 513a. The information indicating E7 is held in the information as the originating end in the layer 2 (the fourth row) like the management information 513a. Here, the determining unit 232 excludes layers including a section and a higher-level section, which respectively have a communication path that does not use L6. Accordingly, the determining unit 232 identifies the layer 2 (the fourth row) and the layer 3 (the sixth row) as the layers including the information indicating the VMs (E1 and E7) to which L6 is connected. The management information writing unit 242 writes access failure information to the notification information in the layer 2 (the fourth row) and the layer 3 (the sixth row), which are identified by the determining unit 232.

Similarly, the determining unit 232 identifies layers including the information indicating the VMs (E3 and E7) connected to L7 as the originating end or the terminating end of the section information. The information indicating E3 is held in the information as the originating end in the layer 1 (the first and the second rows) like the management information 513a. The information indicating E7 is held in the information as the originating end in the layer 2 (the fourth row) like the management information 513a. Here, the determining unit 232 excludes layers including a section and a higher-level section, which respectively have a communication path that does not use L7. Accordingly, the determining unit 232 identifies the layer 1 (the second row) and the layer 2 (the fourth row) as the layers including the information indicating the VMs (E3 and E7) to which L7 is connected. The management information writing unit 242 writes access failure information to the notification information of the layer 1 (the second row) and the layer 2 (the fourth row), which are identified by the determining unit 232. With the above described process, the management information 513a illustrated in FIG. 8A is obtained.

When the output fault information has been written to the management information 513a, the identifying unit 231 identifies whether the notification information is the fault that has occurred in the communication system 300 in the case C13. The process for identifying whether the notification information of the management information 513a is the fault that has occurred in the communication system 300 in the case C13 is executed by using fault tree diagrams. Since all pieces of the notification information of the management information 513a are faults that have occurred in the communication system 300 in the case C13, the notification information is held unchanged as the fault information in the case C13 in the management information 513b. Moreover, the layers including the fault information in the notification information are set as being abnormal as the state information of the section. Details of the process executed when the management information 513b is generated from the management information 513a are described below.

Figure 9:
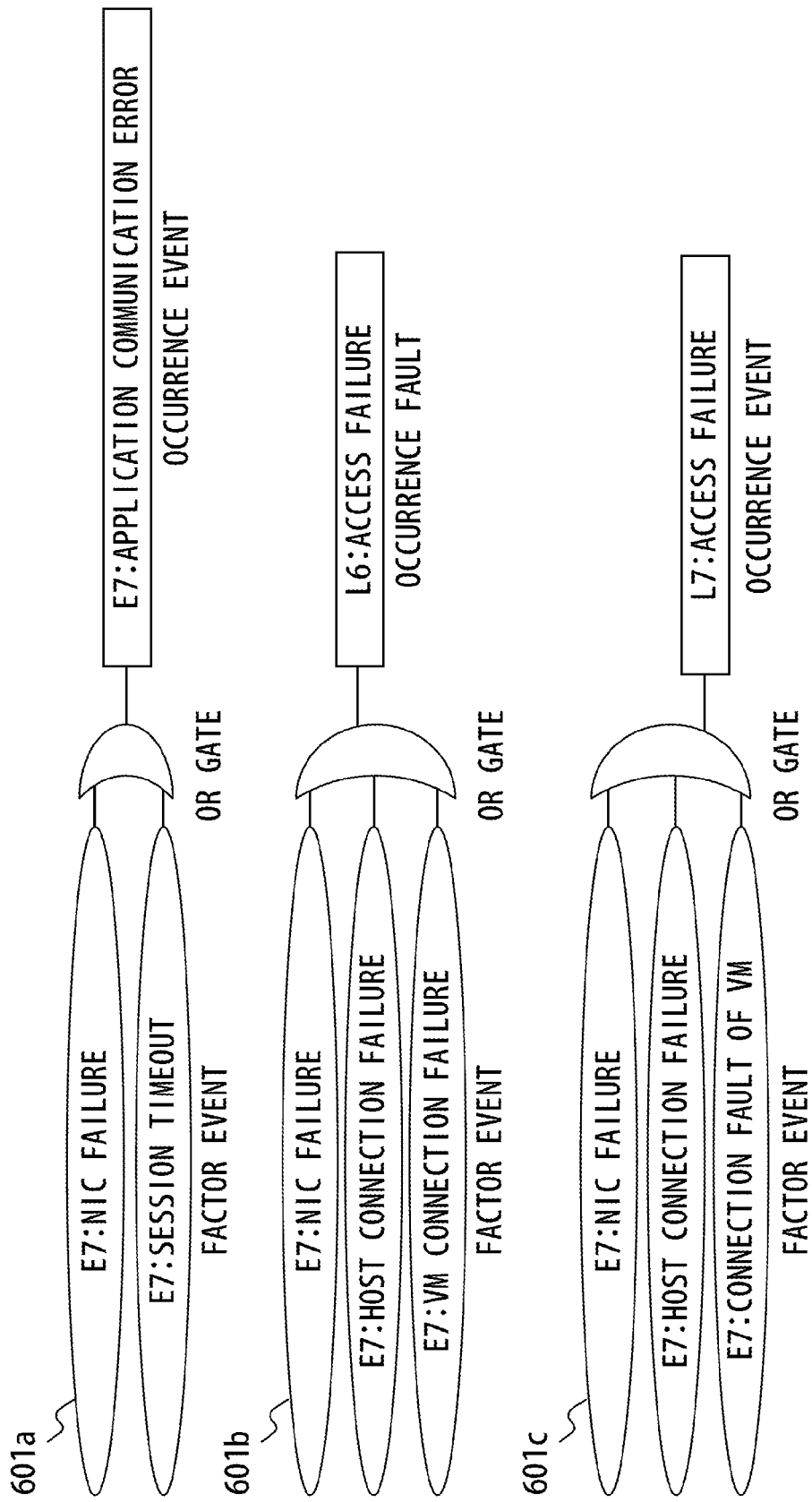
FIG. 9 is an explanatory diagram of examples (No. 1) of fault tree diagrams.

FIG. 9 is an explanatory diagram of examples (No. 1) of fault tree diagrams. The fault tree diagrams illustrated in FIG. 9 are used to determine whether the notification information of the management information 513a in the case C13 is information of the fault that has occurred in the communication system 300 in the case C13. The fault tree diagrams 601 (601a to 603c) are diagrams that make an association between a factor event and an occurrence event. The factor event may be fault information output alone. The occurrence event is an event thought to occur from a combination with the factor event. For a factor event and an occurrence event, when at least one of the factor events is output as fault information like an OR gate, fault information as an occurrence event is output.

A process for identifying whether the notification information of the management information 513a in the case C13 is information of a fault that has occurred in the communication system 300 in the case C13 is described with reference to the fault tree diagrams 601 (601a to 603c). The identifying unit 231 identifies a diagram including access failure information of L7 from the fault tree diagrams 601 (601a to 603c). The access failure information of L7 is registered as an occurrence event within the fault tree diagram 601c. Since the access failure information of L7 is an occurrence event, it is fault information that does not occur alone. Accordingly, the determining unit 232 determines whether the management information 513 (513a and 513b) includes notification information or fault information, which is predicted to be output along with the access failure information of L7. Here, the fault information predicted to be output along with the access failure information of L7 is an NIC failure of E7, a host connection failure of E7, or a VM connection failure of E7. Since the NIC failure of E7 is included in the notification information of the management information 513a, the determining unit 232 determines that the access failure information of L7 is a fault that has occurred with the NIC failure of E7. Since the access failure of L7 is a fault that has occurred with the NIC failure of E7, the management information writing unit 242 writes the access failure information of L7 to the fault information in the case C13 within the management information. A process similar to that for the access failure information of L7 is also executed for the access failure information of L6.

The identifying unit 231 identifies a diagram including the NIC failure information of E7 from the fault tree diagrams 601 (601a to 603c). The NIC failure information of E7 is registered as a factor event within the fault tree diagram 601a. Accordingly, the identifying unit 231 identifies the NIC failure information of E7 as fault information that may be output alone. Since the NIC failure information of E7 is fault information that may be output alone, the management information writing unit 242 writes the NIC failure information of E7 as the fault information in the case C13, as in the case of the management information 513b.

When the determining unit 232 has determined whether the notification information is the fault information in each case, it determines that a running state of a section that holds fault information in each case is abnormal. The process for determining whether the running state of the section is abnormal is executed sequentially from a higher-level section. When the running state of a higher-level section is abnormal, the determining unit 232 can also determine that the running state of a lower-level section is abnormal. Accordingly, when the determining unit 232 determines that a running state of a section in the second row of the layer 1 is abnormal, it also determines that the running state of the section in the layer 2 (the fourth row), which has the second row of the layer 1 as the higher-level section, and that of the layer 3 (the sixth row) are abnormal. The management information writing unit 242 writes the running states of the sections in the layer 1 (the second row), the layer 2 (the fourth row) and the layer 3 (the sixth row) as being abnormal. As a result, the management information 513b is obtained.

The communication system 300 in a case C14 illustrated in FIG. 7 is an example after E7 migrates the process of the communication system to the server 311c in order to continue the process. Note that E7 may be migrated to the server 311a different from the server 311b. The communication system 300 in the case C14 creates a VM of E7 in the server 311c, and forms a new communication path using L8, E7, and L9. The path information collecting unit 251 of the monitoring apparatus collects management information of the communication system 300 in the case C14. An example of the management information in the case C14 is represented by management information 514a illustrated in FIG. 10A. The management information 514a illustrated in FIG. 10A is obtained by replacing the communication path of L6, E7, and L7 of the management information 512 (FIG. 6B) with a communication path of L8, E7, and L9.

An example of a process executed after the system is changed to the communication system in the case C14 is described below.

In the communication system 300 in the case C13, the NIC where a fault occurs is allocated to the VM of E7. Therefore, the VM cannot transmit fault information (the second fault information) to the monitoring apparatus. Accordingly, the VM of E7, which runs in the communication system 300 in the case C14, operates in the server 311c, so that the VM can use an NIC where a fault does not occur, and notifies the monitoring apparatus of the second fault information (information held while the VM was waiting). Moreover, since E7 executes the process in the server 311c where a fault does not occur, E7 recognizes that it has recovered from the fault. Therefore, E7 notifies the monitoring apparatus of recovery information indicating that E7 has been recovered from the state of the fault. The process of E7 is migrated from the server 311b where the fault occurs to the server 311c where a fault does not occur, whereby the communication system 300 can continue the communication between UEs.

In the case C14, the monitoring apparatus receives the second fault information not from the server 311b but from the server 311c where a fault does not occur. Upon receipt of the second fault information, the processing unit 230 of the monitoring apparatus starts a process for identifying a position of the fault within the communication system 300 by using management information in each case and an FTA.

The management information 514b is information obtained by updating the fault information in the management information 514a. In the communication system. 300 in the case C14, an application communication error is output from E7 as the fault information. The determining unit 232 identifies a layer that includes the information indicating E7 as an originating end or a terminating end of section information. The information indicating E7 is stored as the starting end of the layer 2 (the fourth row) of the management information 514b. The determining unit 232 identifies the layer 2 (the fourth row) as a layer that includes the information indicating E7 in the section information. The management information writing unit 242 writes the application communication error to the notification information of the layer 2 (the fourth row) identified by the determining unit 232.

When the output fault information has been written to the management information 514b, the identifying unit 231 determines whether the notification information indicates the fault that has occurred in the communication system 300 in the case C14. The process for determining whether the notification information of the management information 514b is a fault that has occurred in the communication system 300 in the case C14 is executed by using fault tree diagrams (to be described below with reference to FIG. 11).

In the communication system according to this embodiment, as will be described later, it can be determined that an application communication error is not an error occurring in the case C14 illustrated in FIG. 7.

Figure 11:
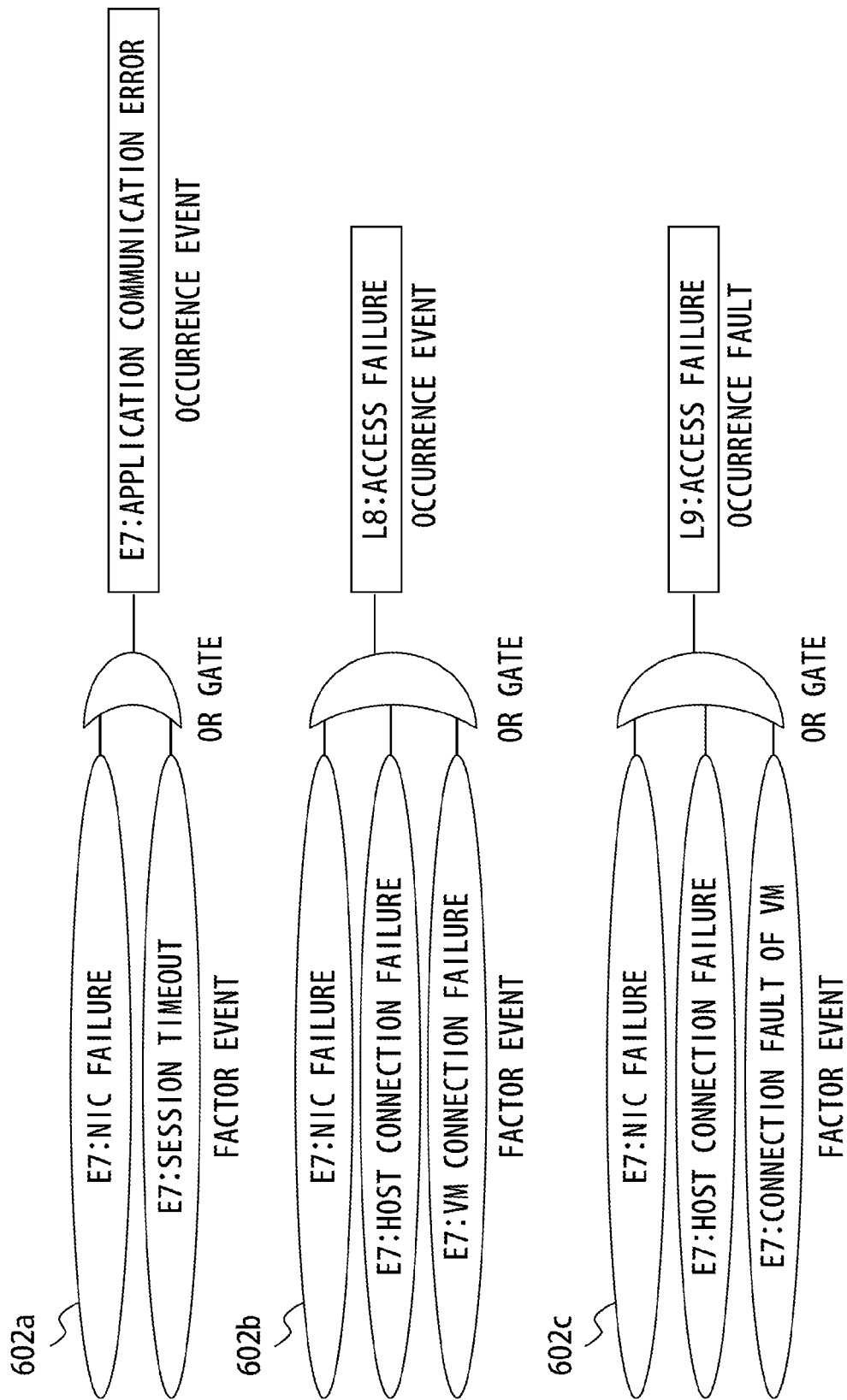
FIG. 11 is an explanatory diagram of examples (No. 2) of fault tree diagrams.

FIG. 11 is an explanatory diagram of examples (No. 2) of fault tree diagrams. The fault tree diagrams 602 (602a to 602c) illustrated in FIG. 11 are used for the communication system 300 in the case C14. The identifying unit 231 identifies a diagram including an application communication error output from E7 from the fault tree diagrams 602 (602a to 602c). The application communication error of E7 is registered as an occurrence event within the fault tree diagram 602a. Since the application communication error is an occurrence event, it is fault information that does not occur alone. Accordingly, the determining unit 232 determines whether the management information 514b includes the fault information predicted to be output along with the application communication error of E7. Here, the fault information predicted to be output along with the application communication error is the NIC failure of E7, and a session timeout of E7. However, the management information 514b does not include the NIC failure of E7 or the session timeout of E7.

Since the application communication error of E7 is not caused by a fault that has occurred in the case C14, the identifying unit 231 selects another case of the communication system 300, in which the application communication error of E7 occurs. The identifying unit 231 identifies the case of the communication system on the basis of management information including the NIC failure of E7 or the session timeout of E7, which is the fault information predicted to be output along with the application communication error of E7. The identifying unit 231 identifies the information indicating the NIC failure of E7 as being included in the management information 513b (FIG. 8B) in the case C13.

FIG. 12 is an explanatory diagram (No. 4) of an example of management information. The management information 513c illustrated in FIG. 12 is information obtained by updating the application communication error of E7 in the management information 513b generated by the communication system in the case C13 illustrated in FIG. 7. The management information 513b in the case C13 identified by the identifying unit 231 includes information indicating the NIC failure of E7. Accordingly, it can be determined that the application communication error of E7 is the fault information occurring with the NIC failure that has occurred in the communication system in the case C13. The management information writing unit 242 writes the application communication error of E7 to the fault information in the case C13 in the layer 2 (the fourth row), including the NIC failure of E7.

Thus, even when an application communication error, which is fault information caused by a fault that has occurred in the case C13, is received at a point in time in the case C14, the monitoring apparatus can make an association between the NIC failure in the case C13 and the application communication error. Moreover, the monitoring apparatus can determine the NIC failure that has occurred in E7 as a cause of the application communication error. Thus, the first fault information, which is predicted to be output along with the second fault information, is identified even when the second fault information is output alone, whereby a point in time at which the fault has occurred and a cause of the fault can be identified.

The monitoring apparatus determines whether a case of a point in time at which a fault occurs is the same as a case of a point in time at which the monitoring apparatus 102 is notified of the fault. Therefore, the administrator can determine whether measures are to be taken urgently. Moreover, the monitoring apparatus executes the process for identifying a main cause and a position of a fault, whereby the administrator can learn the cause of the fault without being conscious of a dynamic change of the communication system. Furthermore, the operations for identifying the cause of the fault, which are performed by the administrator, can be reduced.

FIG. 13 is a flowchart for explaining an example (No. 1) of a process for updating management information. The process for updating management information, which is illustrated in FIG. 13, is executed at certain time intervals. The identifying unit 231 selects management information in the latest case (step S1). The determining unit 232 determines whether fault information is held in the storage unit 210 (step S2). The processing unit 230 and the writing unit 240 execute the process for updating management information (step S3 if "YES" in step S2). The determining unit 232 determines whether the fault information is to be succeeded (step S4). The succession of the fault information is a process for another piece of management information succeeding fault information when the fault information held in the storage unit 210 is not included in the management information processed in step S3. The identifying unit 231 selects the management information in the immediately preceding case (step S5 if "YES" in step S4). The monitoring apparatus completes the process for updating management information ("NO" in step S2 or S4).

Figure 14:
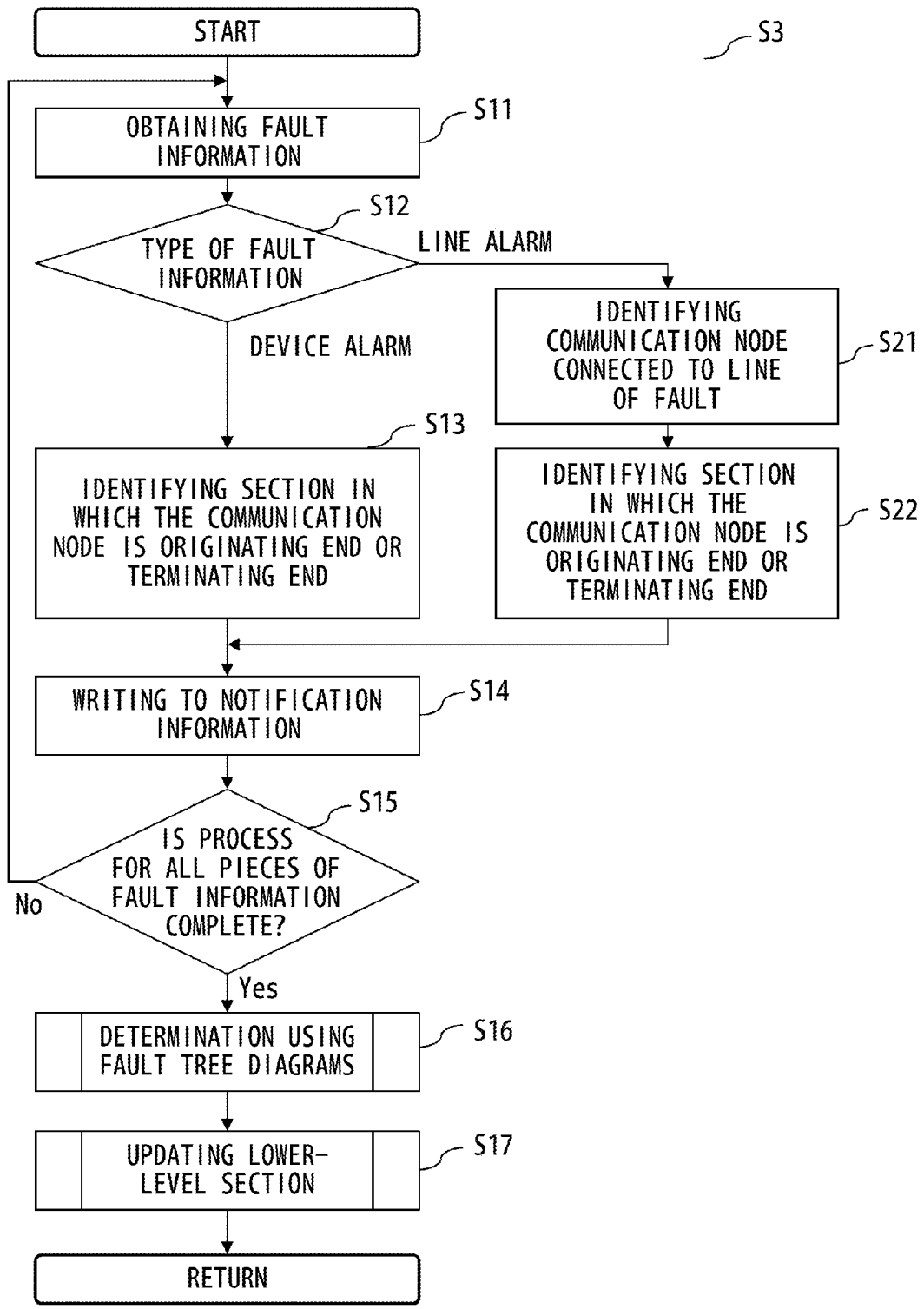
FIG. 14 is a flowchart for explaining an example (No. 2) of the process for updating management information.
Figure 15A:
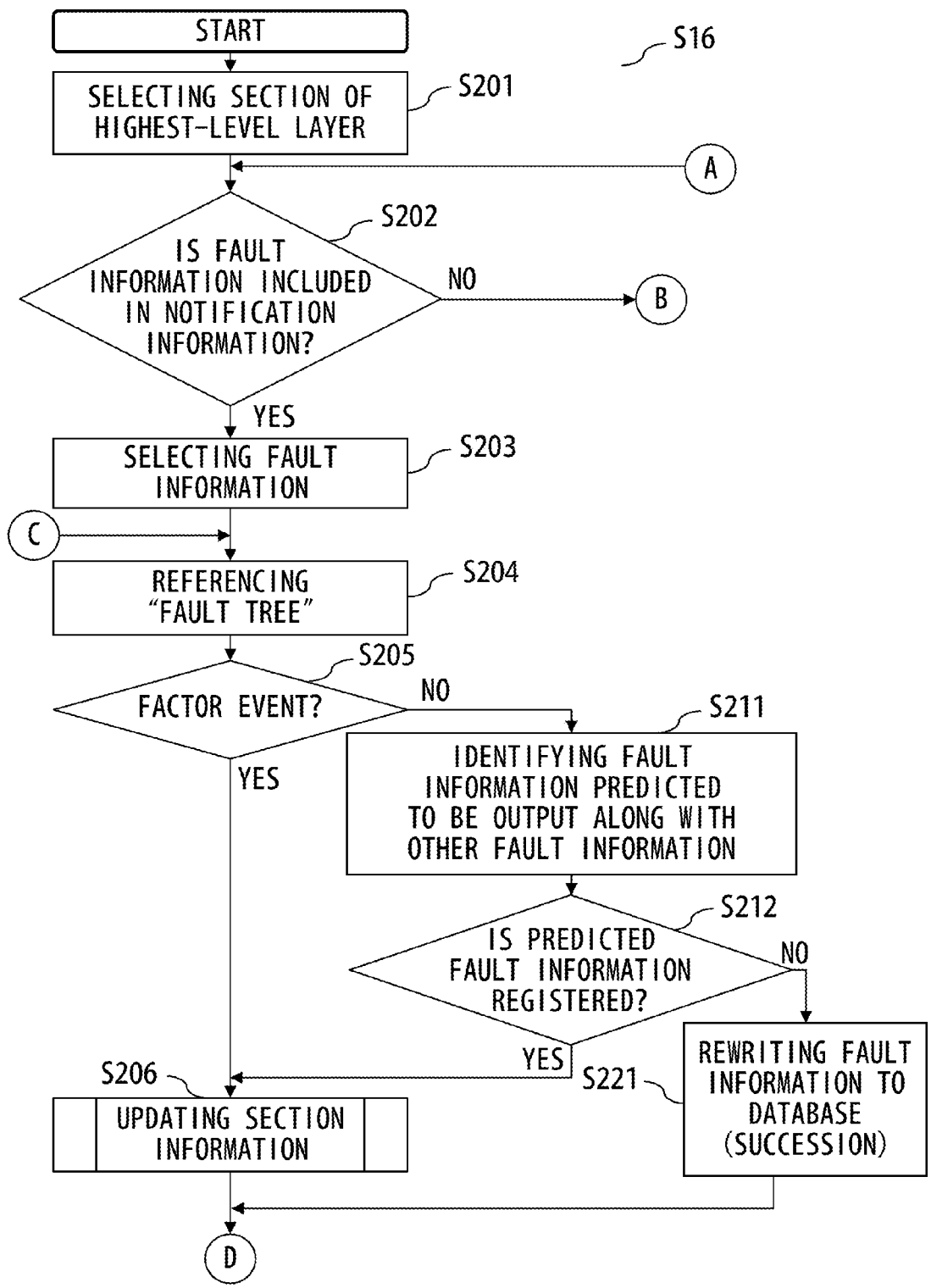
FIG. 15A is a flowchart for explaining an example of a determination process using a fault tree diagram.
Figure 15B:
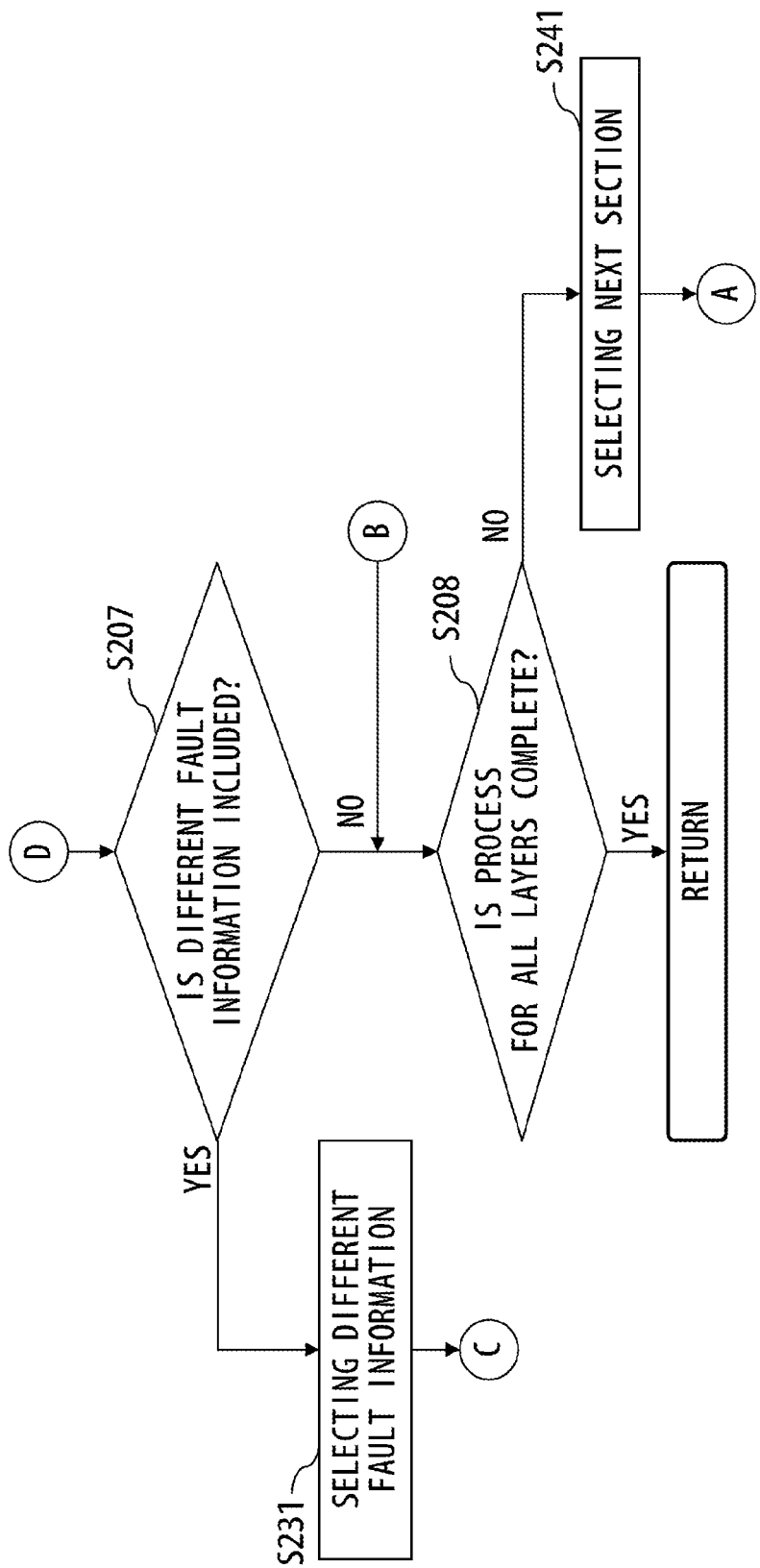
FIG. 15B is a flowchart for explaining an example of the determination process using the fault tree diagram.

FIG. 14 is a flowchart for explaining an example (No. 2) of the process for updating management information. The process represented by the flowchart illustrated in FIG. 14 is the process for updating management information, which is executed in step S3 illustrated in FIG. 13. The management information writing unit 242 obtains fault information from the storage unit 210 (step S11). The determining unit 232 determines whether the obtained fault information is either a device alarm or a line alarm (step S12). The device alarm is fault information that indicates a fault in a device. The line alarm is fault information that indicates a fault on a communication path. When the fault information is a device alarm, the determining unit 232 identifies a layer which has information that is included in the fault information and indicates a VM as an originating end or a terminating end in section information (step S13). When the fault information is a line alarm, the determining unit 232 obtains information of a VM which is connected to a path included in the fault information, from the path information included in the fault information (step S21). The determining unit 232 identifies a layer including the VM as the originating end or the terminating end from the obtained information of the VM (step S22). The management information writing unit 242 writes the fault information to the notification information of the layer identified by the determining unit 232 (step S14). The determining unit 232 determines whether the process has been executed for all pieces of fault information held in the storage unit 210 (step S15). The determining unit 232 executes a determination process using fault tree diagrams (step S16). The process executed in step S16 will be described later with reference to FIG. 15(FIG. 15A and FIG. 15B). When a running state of a higher-level section is abnormal, the management information writing unit 242 also writes information of the abnormal state to a lower-level section (step S17)

FIG. 15(FIG. 15A and FIG. 15B) is a flowchart for explaining an example of the determination process using fault tree diagrams. The process represented by the flowchart illustrated in FIG. 15(FIG. 15A and FIG. 15B) is the identification process using the fault tree diagrams, which is executed in step S16 illustrated in FIG. 14. The identifying unit 231 selects a section of the highest-level layer within the management information. The identifying unit 231 determines whether notification information of the selected section holds fault information (step S202). The identifying unit 231 selects fault information held in the notification information (step S203 if "YES" in S202). The identifying unit 231 reads the fault tree diagrams (step S204). The identifying unit 231 determines whether the fault information is a factor event (step S205).

The identifying unit 231 identifies the fault information predicted to be output along with other fault information (step S211 if "NO" in S205). The determining unit 232 determines whether the fault information predicted to be output along with the other fault information is held in the management information (step S212). When the fault information predicted to be output along with the other fault information is held in the management information, the identifying unit 231 transfers the process to S206. When the fault information predicted to be output along with the other fault information is not held in the management information, the management information writing unit 242 recognizes the fault information as succeeded information, and rewrites the information to a database (step S221 if "NO" in step S212). Upon termination of the process in step S221, the process is transferred to step S207.

When the fault information is a factor event, the management information writing unit 242 writes the fault information held in the notification information to fault information of each case (step S206 if "YES" in steps S205 or if "YES" in step S212). The identifying unit 231 determines whether fault information yet to be processed in step S205 is left in the fault information of the notification information in the selected section (step S207). When the fault information yet to be processed in step S205 is left, the identifying unit 231 repeats the process in and after step S204 for the fault information yet to be processed in step S205 (step S231 if "YES" in step S207). The identifying unit 231 determines whether the process in steps S202 to S207 is complete for sections of all layers (step S208 if "NO" in step S207). When the process in steps S202 to S207 is not complete for the sections of all the layers, the identifying unit 231 selects the next section, and repeats the process in and after S202 (step S241 if "NO" in step S208).

Figure 16:
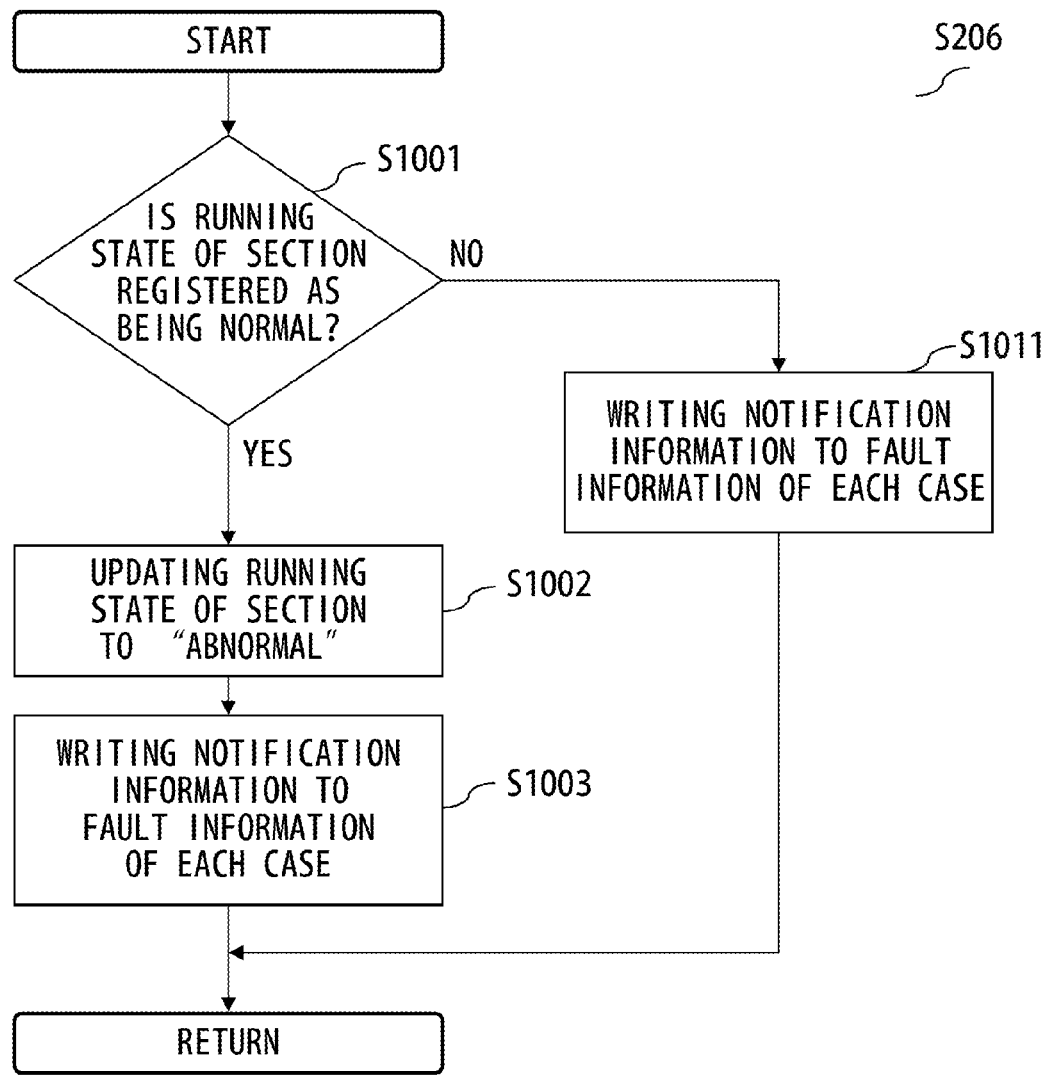
FIG. 16 is a flowchart for explaining an example (No. 1) of a process for a management information writing unit.

FIG. 16 is a flowchart for explaining an example (No. 1) of a process of the management information writing unit. The process represented by the flowchart illustrated in FIG. 16 is the process of the management information writing unit, which is executed in step S206 illustrated in FIG. 15A. The determining unit 232 determines whether a running state of a section to be written is registered as being normal (step S1001). The management information writing unit 242 writes the running state of the section to be written as being abnormal (step S1002 if "YES" in step S1001). The management information writing unit 242 writes the notification information to the fault information of each case for the section to be written (step S1003). The management information writing unit 242 writes the notification information to the fault information of each case for the section to be written (step S1011 if "NO" in step S1001).

FIG. 17 is a flowchart for explaining an example (No. 2) of the process of the management information writing unit. The process represented by the flowchart illustrated in FIG. 17 is the process of the management information writing unit, which is executed in step S17 illustrated in FIG. 14. The determining unit 232 selects a section in the second layer (step S301). The determining unit 232 determines whether a running state of a higher-level section in the selected section is registered as being normal (step S302). The determining unit 232 determines whether the running state of the selected section is registered as being normal (step S303 if "NO" in step S302). The management information writing unit 242 writes the running state of the selected section as being abnormal (step S304 if "YES" in step S303). The management information writing unit 242 writes information indicating that the higher-level section is abnormal to the fault information of each case for the selected section (step S305). The determining unit 232 determines whether the process in steps S302 to S305 is complete for all the sections within the management information (step S306 if "YES" in step S302 or if "NO" in step S303). The determining unit 232 selects the next section within the management information (step S311 if "NO" in step S306).

As described above, with the method according to this embodiment, the monitoring apparatus determines whether a case of a point in time at which a fault occurs is the same as a point in time at which the fault is reported, whereby an administrator can determine whether measures are to be urgently taken against the fault. Moreover, the monitoring apparatus executes the process for identifying a main cause and a position of the fault, whereby the administrator can learn the cause of the fault without being conscious of a dynamic change in the communication system. Furthermore, the labor performed by the administrator for identifying the cause of the fault can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or embodiments of the present invention have been described in detail, it should be understood that the various changes, substitutions, and alterations could be made hereto without departing from the spirit and scope of the invention.

What is claimed is:

1. A monitoring apparatus that monitors a communication system including at least one communication device, the monitoring apparatus comprising:
    a memory configured to store system information that represents an arrangement and a communication path of virtual machines used in a second virtual system when the second virtual system is generated by changing a first virtual system determined according to a combination of an arrangement of a plurality of virtual machines arranged in the at least one communication device, and a communication path between the plurality of virtual machines;
    a processor configured to receive fault information that reports an occurrence of a fault, and to identify the fault information as being generated in a virtual machine within the first virtual system when a specified fault detected in a case where the fault information is transmitted from any of the virtual machines within the second virtual system represented by the system information is not detected, the first virtual system being a system before the changing.

2. The monitoring apparatus according to claim 1, wherein
    the memory pre-stores fault tree information used in an FTA (Fault Tree Analysis), and
    the processor recognizes a type of the specified fault by referencing the fault tree information.

3. The monitoring apparatus according to claim 1, wherein
    the memory further stores different system information that represents an arrangement and a communication path of virtual machines used in the first virtual system, and
    the processor determines a cause and a position of the fault according to the different system information, the fault information, and the type of the specified fault when the fault information is identified as being generated by a virtual machine within the first virtual system is further comprised.

4. A monitoring method for causing a computer to execute a process for monitoring a communication system including at least one communication device, the process comprising:
    storing, by a processor, system information, when a change of a first virtual system determined according to a combination of arrangement of a plurality of virtual machines arranged in the at least one communication device, and a communication path between the plurality of virtual machines, causes a second virtual system to generate, the system information representing an arrangement and a communication path of virtual machines used in a second virtual system;
    receiving, by the processor, fault information that reports an occurrence of a fault; and
    identifying, by the processor, the fault information as being generated in a virtual machine within the first virtual system when a specified fault detected in a case where the fault information is transmitted from any of the virtual machines within the second virtual system represented by the system information is not detected, the first virtual system being a system before the change.

5. The monitoring method according to claim 4, wherein
    the computer pre-stores fault tree information used in an FTA (Fault Tree Analysis), and
    the process further comprises recognizing a type of the specified fault by referencing the fault tree information.

6. The monitoring method according to claim 4, wherein the process further comprises:
    storing, by the processor, different system information that represents an arrangement and a communication path of virtual machines used in the first virtual system; and
    determining, by the processor, a cause and a position of the fault according to the different system information, the fault information, and a type of the specified fault when the fault information is identified as being generated by a virtual machine within the first virtual system.

7. A non-transitory computer-readable recording medium having stored therein a monitoring program, executed in a monitoring apparatus that monitors a communication system including at least one communication device, for causing a computer to execute a process comprising:
    storing system information, when a change of a first virtual system determined according to a combination of arrangement of a plurality of virtual machines arranged in the at least one communication device, and a communication path between the plurality of virtual machines, causes a second virtual system to generate, the system information representing an arrangement and a communication path of virtual machines used in a second virtual system;
    receiving fault information that reports an occurrence of a fault; and
    identifying the fault information as being generated in a virtual machine within the first virtual system when a specified fault detected in a case where the fault information is transmitted from any of the virtual machines within the second virtual system represented by the system information is not detected, the first virtual system being a system before the change.

8. The non-transitory computer-readable recording medium according to claim 7, wherein
    the monitoring apparatus pre-stores fault tree information used in an FTA (Fault Tree analysis), and
    the process further comprises recognizing a type of the specified fault by referencing the fault tree information.

9. The non-transitory computer-readable recording medium according to claim 7, wherein the process further comprises:
  storing different system information that represents an arrangement and a communication path of virtual machines used in the first virtual system; and
  determining a cause and a position of the fault according to the different system information, the fault information, and a type of the specified fault when the fault information is identified as being generated by a virtual machine within the first virtual system.

* * * * *